(12) United States Patent
Labbe et al.

(10) Patent No.: US 12,415,583 B2
(45) Date of Patent: Sep. 16, 2025

(54) STORAGE CONTAINER AND SYSTEM FOR COVERING PART OF A STORAGE CONTAINER

(71) Applicant: BOMBARDIER RECREATIONAL PRODUCTS INC., Valcourt (CA)

(72) Inventors: David Labbe, Acton Vale (CA); Alexandre Morin-Savard, Drummondville (CA); Caroline Letendre, Drummondville (CA); Nabil Guendoul, Granby (CA); Frederic Lambert, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 199 days.

(21) Appl. No.: 17/865,217

(22) Filed: Jul. 14, 2022

(65) Prior Publication Data

US 2023/0015955 A1    Jan. 19, 2023

Related U.S. Application Data

(60) Provisional application No. 63/221,538, filed on Jul. 14, 2021.

(51) Int. Cl.
| | |
|---|---|
| *B62J 7/08* | (2006.01) |
| *A45C 13/10* | (2006.01) |
| *A45F 3/02* | (2006.01) |
| *B62J 7/04* | (2006.01) |

(52) U.S. Cl.
CPC ............. *B62J 7/08* (2013.01); *A45C 13/103* (2013.01); *A45F 3/02* (2013.01); *B62J 7/04* (2013.01)

(58) Field of Classification Search
CPC ... B62J 7/04; B62J 7/08; A45C 13/103; A45F 3/02
USPC ......................................................... 224/413
See application file for complete search history.

(56) References Cited

U.S. PATENT DOCUMENTS

| | | | | |
|---|---|---|---|---|
| 2,798,524 A | * | 7/1957 | Ryon ...................... | A45C 3/08 150/118 |
| 4,059,207 A | * | 11/1977 | Jackson ................ | A45C 13/00 224/463 |
| 4,236,657 A | * | 12/1980 | Brunton .................. | A45F 3/04 224/582 |
| 5,984,154 A | * | 11/1999 | Scicluna .................. | A45F 3/04 224/644 |

(Continued)

FOREIGN PATENT DOCUMENTS

CA            2993414 A1    2/2017

*Primary Examiner* — Peter N Helvey
(74) *Attorney, Agent, or Firm* — BCF LLP

(57) ABSTRACT

A storage container includes: a container body defining an internal volume for storing items therein; a first attachment system connected to the container body, the first attachment system including at least one first attachment feature for attaching the storage container; a second attachment system connected to the container body, the second attachment system including at least one second attachment feature for attaching the storage container, the at least one second attachment feature being different from the at least one first attachment feature; and a cover moveable between a first position and a second position on the container body to selectively cover the first attachment system and the second attachment system respectively. A system for covering part of a storage container is also provided.

18 Claims, 24 Drawing Sheets

(56) References Cited

U.S. PATENT DOCUMENTS

| | | | | |
|---|---|---|---|---|
| 6,029,875 | A * | 2/2000 | Johnston | B62J 7/04 224/584 |
| 6,305,590 | B1 * | 10/2001 | Hayes | B62J 9/25 190/110 |
| 6,530,507 | B2 * | 3/2003 | Oh | A45C 5/14 224/653 |
| 6,742,684 | B2 * | 6/2004 | Oh | A45F 4/02 224/652 |
| 7,191,925 | B2 * | 3/2007 | Aris | A45C 9/00 224/582 |
| 7,997,602 | B2 * | 8/2011 | Chan | B62J 7/04 180/219 |
| 8,590,759 | B1 * | 11/2013 | Mooney | A45F 3/04 224/645 |
| 9,751,592 | B2 | 9/2017 | Labbe et al. | |
| 10,172,429 | B1 * | 1/2019 | Smith | A45C 13/10 |
| 11,097,800 | B1 * | 8/2021 | Trentacosta | B62J 9/26 |
| 2003/0213821 | A1 * | 11/2003 | Oh | A45C 9/00 224/652 |
| 2004/0011840 | A1 * | 1/2004 | Lovett | B62J 9/23 224/427 |
| 2004/0100046 | A1 * | 5/2004 | Darling | B60N 2/2848 280/30 |
| 2013/0306696 | A1 * | 11/2013 | Salas Garcia | A45F 3/047 224/645 |
| 2019/0359278 | A1 * | 11/2019 | Easley | A45F 3/04 |
| 2023/0111464 | A1 * | 4/2023 | Dalan | B62J 7/08 224/412 |

\* cited by examiner

United States Patent 12,415,583 B2

STORAGE CONTAINER AND SYSTEM FOR COVERING PART OF A STORAGE CONTAINER

CROSS-REFERENCE

The present application claims priority from U.S. Provisional Patent Application No. 63/221,538, filed Jul. 14, 2021, the entirety of which is incorporated by reference herein.

TECHNICAL FIELD

The present technology relates to storage containers, and in particular storage containers configured for removable connection to vehicles.

BACKGROUND

Various types of vehicles can be equipped with a storage container to provide a place for storing items on the vehicle. However, typically, such storage containers can be difficult to carry when disconnected from the vehicle which may be desirable for instance if a user wants to dismount the entire contents of the storage container from the vehicle. Furthermore, it is generally desirable to provide a visually appealing aesthetic to the storage container which can be difficult to do when accommodating functional features such as attachment systems that are required for securing the storage container in place.

Therefore, there is a need for a storage container that addresses at least some of these drawbacks.

SUMMARY

It is an object of the present technology to ameliorate at least some of the inconveniences present in the prior art.

In accordance with an aspect of the present technology, there is provided a storage container. The storage container comprises: a container body defining an internal volume for storing items therein; a first attachment system connected to the container body, the first attachment system comprising at least one first attachment feature for attaching the storage container; a second attachment system connected to the container body, the second attachment system comprising at least one second attachment feature for attaching the storage container, the at least one second attachment feature being different from the at least one first attachment feature; and a cover moveable between a first position and a second position on the container body to selectively cover the first attachment system and the second attachment system respectively.

In some embodiments, the at least one first attachment feature is configured for attaching the storage container to a user for carrying of the storage container by the user; and the at least one second attachment feature is configured for attaching the storage container to a vehicle.

In some embodiments, the container body defines an opening for accessing the internal volume; and the opening is disposed at an end of the container body such that the opening is configured to face upward when the storage container is attached to the user.

In some embodiments, the at least one first attachment feature comprises at least one shoulder strap for attaching the storage container to a user.

In some embodiments, the at least one shoulder strap includes two shoulder straps for attaching the storage container on the user's back.

In some embodiments, the at least one second attachment feature comprises at least one anchor for removably attaching the storage container to a vehicle.

In some embodiments, each of the at least one anchor comprises an anchor lock that is moveable between a locked position and an unlocked position to selectively lock the anchor to an anchor fixture connected to the vehicle.

In some embodiments, the at least one first attachment feature is disposed, at least partially, on an opposite side of the container body from the at least one second attachment feature.

In some embodiments, the cover comprises a flap, the cover having a fixed end connected to the container body, the fixed end being in a same position in the first position and the second position of the cover.

In some embodiments, the storage container further comprises: a first cover fastening feature connected to the container body; and a second cover fastening feature connected to the container body, in the first position, the cover being fastened to the first cover fastening feature, and in the second position, the cover being fastened to the second cover fastening feature.

In some embodiments, the first cover fastening feature is a first zip fastener track; the second cover fastening feature is a second zip fastener track; the cover comprises a peripheral zip fastener track disposed around a periphery of the cover; the storage container further comprises: a first slider for engaging the first zip fastener track with the peripheral zip fastener track, the first slider being slidable along a length of the first zip fastener track and a length of the peripheral zip fastener track for selectively fastening the first zip fastener track to the peripheral zip fastener track; and a second slider for engaging the second zip fastener track with the peripheral zip fastener track, the second slider being slidable along a length of the second zip fastener track and the length of the peripheral zip fastener track for selectively fastening the second zip fastener track to the peripheral zip fastener track; in the first position, the periphery of the cover is fastened to the container body via engagement between the first zip fastener track and the peripheral zip fastener track; and in the second position, the periphery of the cover is fastened to the container body via engagement between the second zip fastener track and the peripheral zip fastener track.

In some embodiments, the internal volume is disposed between the at least one first attachment feature and the at least one second attachment feature.

In some embodiments, a vehicle comprises: a driver seat; a motor for driving the vehicle; and the storage container being selectively attached to the vehicle via the at least one second attachment feature, the cover being in the first position to cover the first attachment system.

According to another aspect of the present technology, there is provided a system for covering part of a storage container. The system comprises: a first zip fastener track configured to be connected to a container body of the storage container; a second zip fastener track configured to be connected to the container body of the storage container; a third zip fastener track configured to be connected to a cover of the storage container; a first slider for engaging the first zip fastener track with the third zip fastener track, the first slider being slidable along a length of the first zip fastener track and a length of the third zip fastener track for selectively fastening the first zip fastener track to the third zip fastener track; and a second slider for engaging the second zip fastener track with the third zip fastener track, the second slider being slidable along a length of the second zip fastener track and the length of the third zip fastener track for selectively fastening the second zip fastener track to the third zip fastener track, in a closed position of the first slider, the first zip fastener track being fastened to the third zip fastener track along the lengths thereof such that the cover is in a first position covering a first attachment system of the container, in a closed position of the second slider, the second zip fastener track being fastened to the third zip fastener track along the lengths thereof such that the cover is in a second position covering a second attachment system of the container.

In some embodiments, in the closed position of the first slider, the second slider is in an open position in which at least a majority of the second zip fastener track is unfastened from the third zip fastener track; and in the closed position of the second slider, the first slider is in an open position in which at least a majority of the first zip fastener track is unfastened from the third zip fastener track.

In some embodiments, each of the first and second zip fastener tracks describes generally U-shaped path.

In some embodiments, the first and second zip fastener tracks are configured to be disposed on opposite sides of the container body.

In some embodiments, a storage container comprises: a container body defining an internal volume for storing items therein; a first attachment system connected to the container body, the first attachment system comprising at least one first attachment feature for attaching the storage container; a second attachment system connected to the container body, the second attachment system comprising at least one second attachment feature for attaching the storage container, the at least one second attachment feature being different from the at least one first attachment feature; a cover moveable between a first position and a second position on the container body to selectively cover the first attachment system and the second attachment system respectively; and the system for selectively securing the cover in the first position and the second position.

In some embodiments, the third zip fastener track is a peripheral zip fastener track disposed around a periphery of the cover; in the first position, the periphery of the cover is fastened to the container body via engagement between the first zip fastener track and the peripheral zip fastener track; and in the second position, the periphery of the cover is fastened to the container body via engagement between the second zip fastener track and the peripheral zip fastener track.

For purposes of this application, terms related to spatial orientation when referring to the vehicle orientation and positioning of its components such as forwardly, rearwardly, left, and right are as they would normally be understood by a driver of the vehicle sitting thereon in a normal riding position.

Embodiments of the present technology each have at least one of the above-mentioned aspects, but do not necessarily have all of them.

It is to be understood that if there are any discrepancies between definitions in the present application and in documents incorporated by reference herein, definitions in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
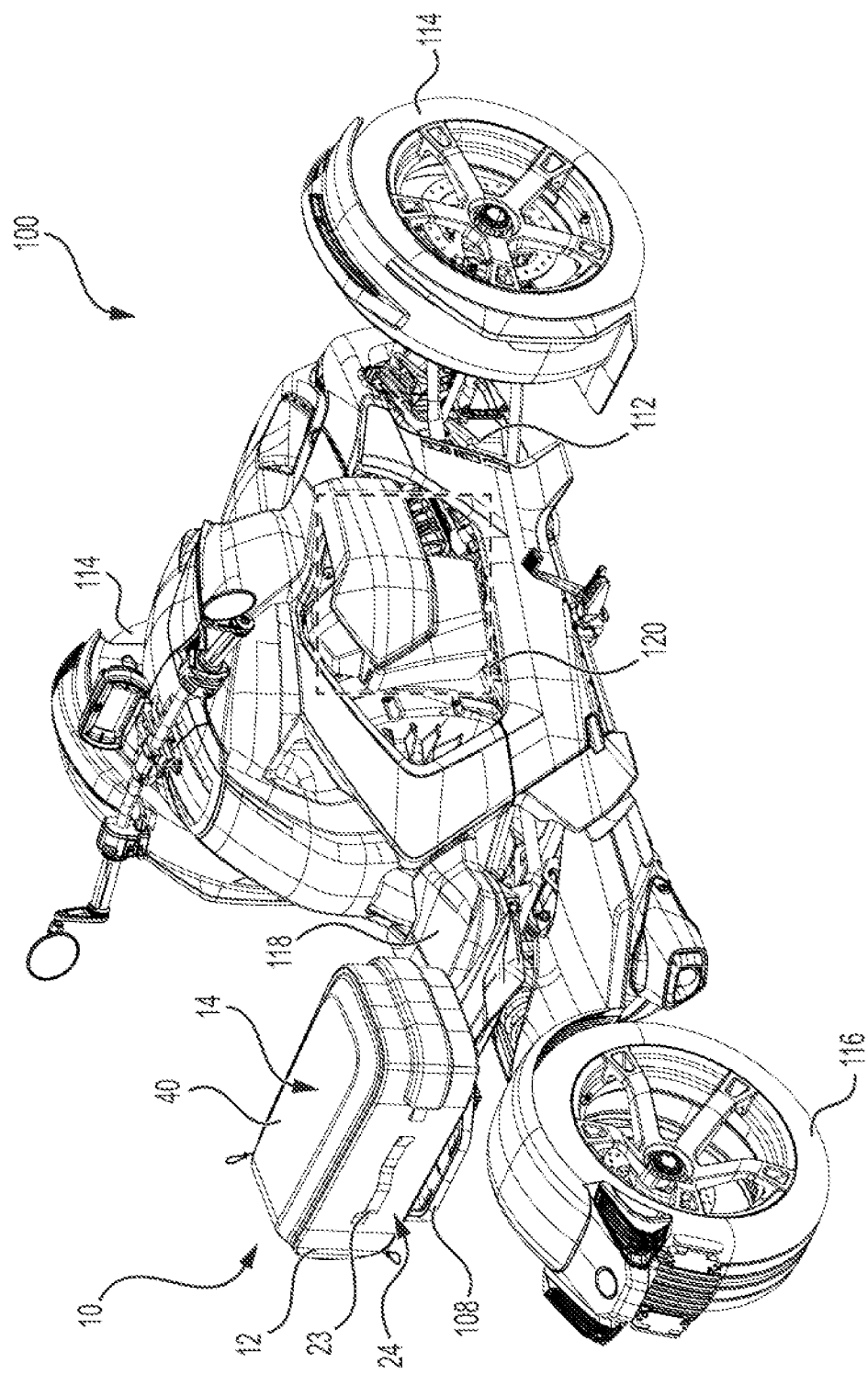
FIG. 1 is a perspective view, taken from a top, rear, right side, of a vehicle equipped with a storage container according to an embodiment of the present technology.

A storage container 10 in accordance with an embodiment of the present technology will be described herein. With reference to FIG. 1, the storage container 10 is configured to be removably attached to a vehicle 100. In this embodiment, the vehicle 100 is a road vehicle 100 designed for travel on paved roads. In particular, the vehicle 100 has a frame 112, two front wheels 114, a rear wheel 116, a driver seat 118 supported by the frame 112, and a motor 120 (illustrated schematically in FIG. 1) such as an internal combustion engine operatively connected to at least one of the wheels 114, 116 for driving the vehicle 100. The vehicle 100 may be any other suitable vehicle in other embodiments, such as an off-road vehicle (e.g., an all-terrain vehicle (ATV), a side-by-side vehicle (SSV), a snowmobile), or a watercraft (e.g., a personal watercraft). The vehicle 100 may thus have ground-engaging members other than wheels (e.g., a track), or even no ground-engaging members in the case of a watercraft.

Figure 2:
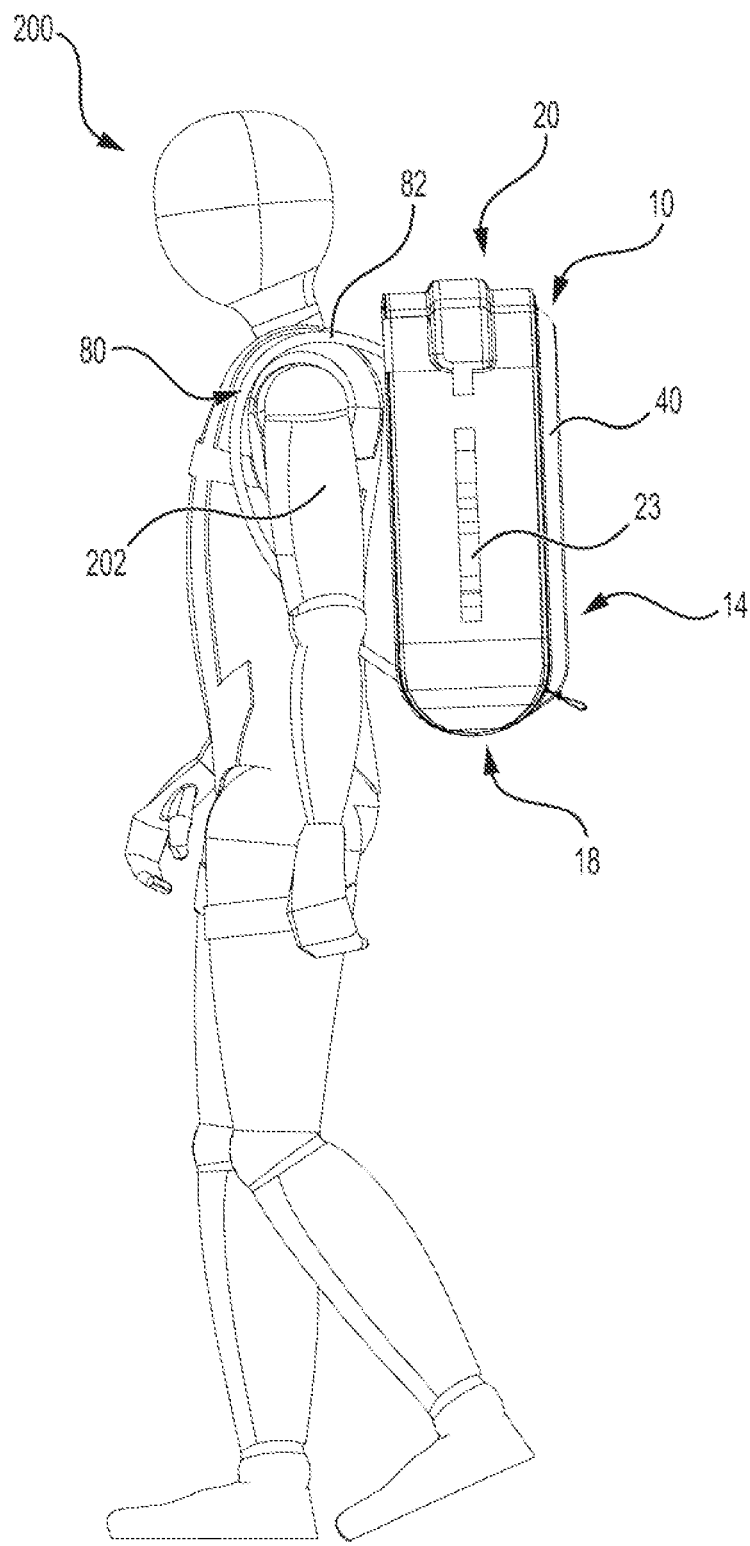
FIG. 2 is a left side elevation view of a user carrying the storage container of FIG. 1.
Figure 3:
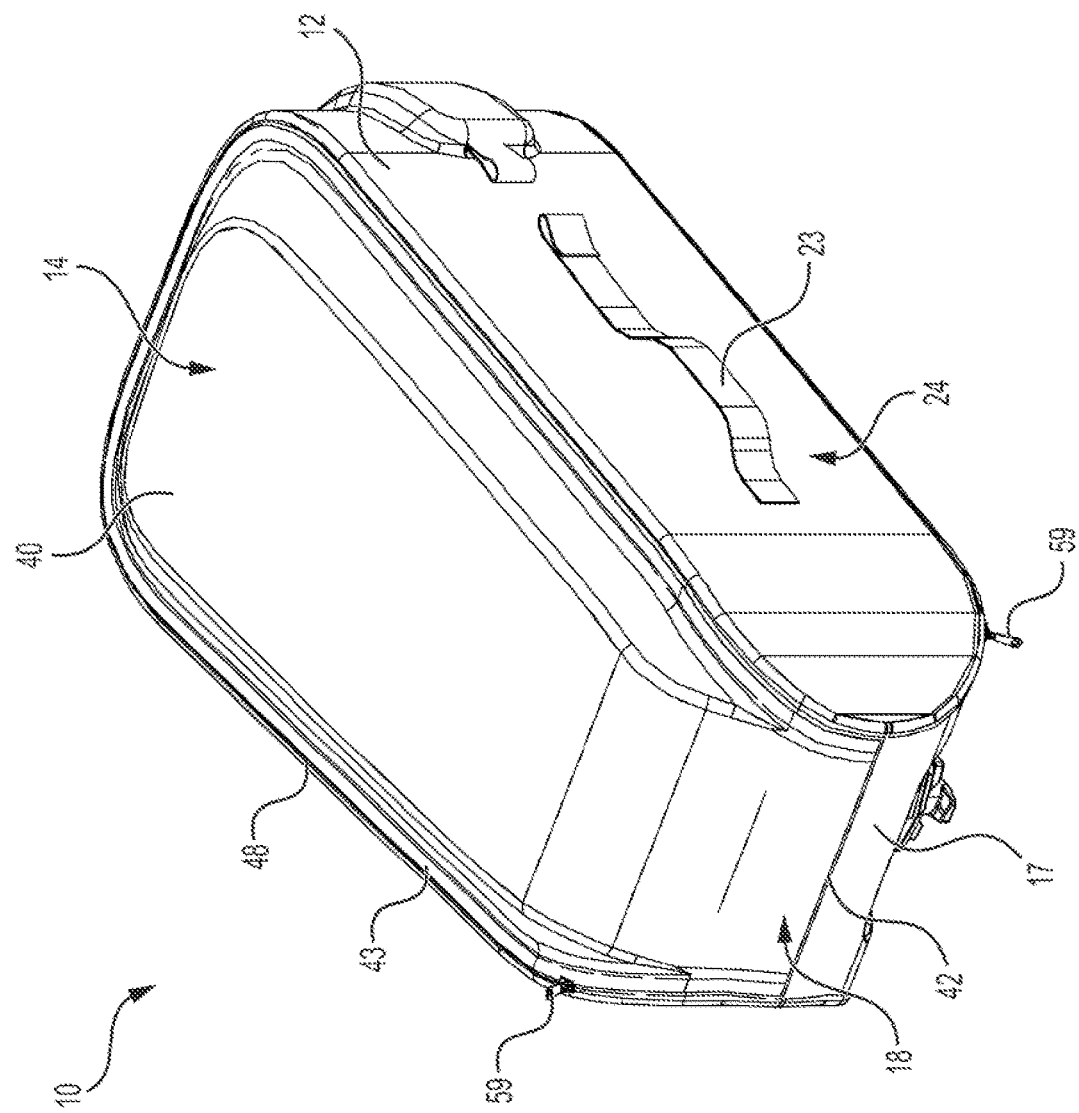
FIG. 3 is a perspective view, taken from a top, rear, left side, of the storage container of FIG. 1, showing a cover of the storage container in an upper position.

With reference to FIG. 2 and as will be described in more detail below, the storage container 100 is also configured to be attached to a user 200. Therefore, when the storage container 10 is detached from the vehicle 100, the user 200 can carry the storage container 10 on his/her back.

The storage container 10 will now be described with reference to FIGS. 3 to 6. The storage container 10 has an upper side 14, a lower side 16, a left side 18, a right side 20, a front side 22 and a rear side 24. It is to be understood that the nomenclature used herein for describing the sides 14, 16, 18, 20, 22, 24 is merely used for consistency with the orientation of the storage container 10 when it is attached to the vehicle 100 (FIG. 1). This nomenclature is thus not intended to be limitative as the storage container 10 could be attached to the vehicle 100 in other orientations in other embodiments. Moreover, as shown in FIG. 2, the storage container 10 has a different orientation when it is attached to the user 200.

Figure 16:
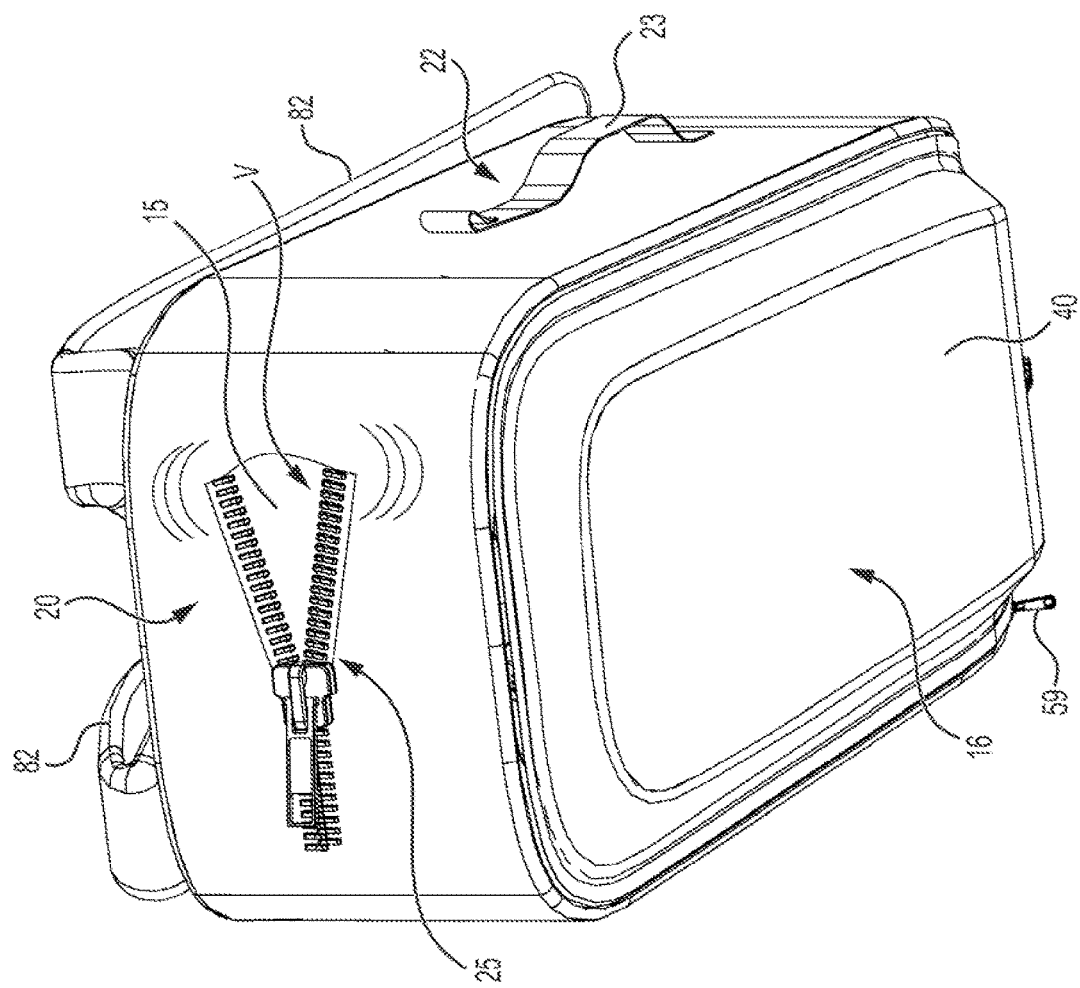
FIG. 16 is a perspective view, taken from a bottom, front, right side, of the storage container of FIG. 13.

The storage container 10 has a container body 12 having walls defining an internal volume V (shown schematically in FIGS. 4 and 5) for storing items therein. Different types of items can be stored within the internal volume V as long as the dimensions of the item and/or of the internal volume V permit it. The container body 12 has a generally rectangular box shape in this embodiment, however the container body 12 could have any other suitable shape in other embodiments. The container body 12 can be made of a rigid material (e.g., a plastic shell), a semi-rigid material or a soft material (e.g., a textile). As shown in FIG. 16, the container body 12 defines an opening 15 for accessing the internal volume V. In this embodiment, the opening 15 is disposed on the right side 20 of the storage container 10, notably at a right end of the storage container 10. As such, when the storage container 10 is attached to the user 200, the opening 15 faces upward. A zip fastener 25 is connected to the container body 12 to selectively open and close the opening 15.

Figure 5:
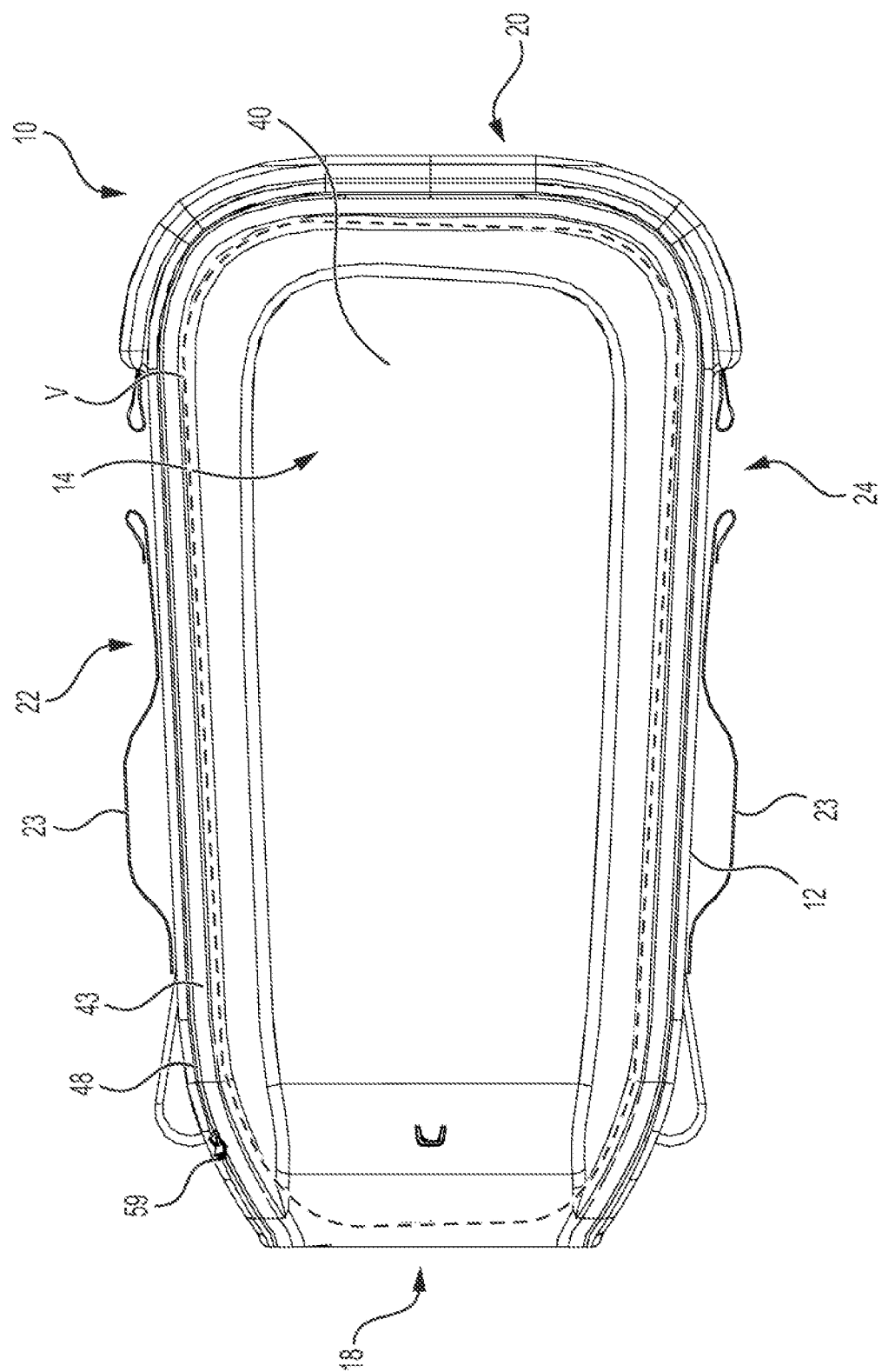
FIG. 5 is a top plan view of the storage container of FIG. 3.

As shown in FIG. 5, two handles 23 are connected to front and rear surfaces 27 of the container body 12 on the front and rear sides 22, 24 of the storage container 10.

With reference to FIGS. 4 and 6 to 8, the storage container 10 has a vehicle attachment system 50 for removably attaching the storage container 10 the vehicle 100. The vehicle attachment system 50 is connected to the container body 12 and, in this embodiment, is disposed on the lower side 16 of the storage container 10. The vehicle attachment system 50 includes two attachment features 52 which are spaced apart from one another. Notably, a left attachment feature 52 is disposed near a left end of the storage container 10 and a right attachment feature 52 is disposed near a right end of the storage container 10.

Figure 6:
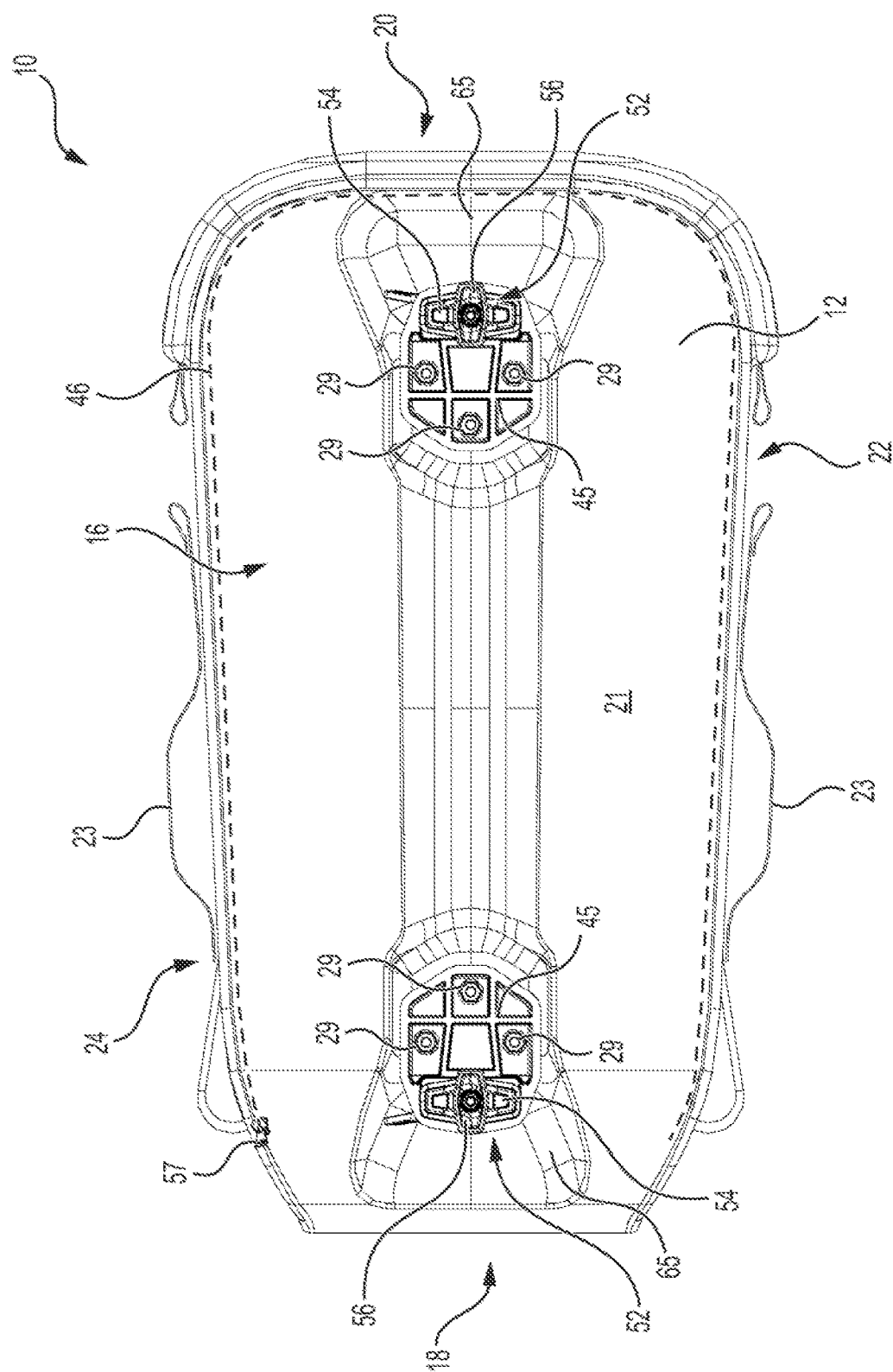
FIG. 6 is a bottom plan view of the storage container of FIG. 3.
Figure 7:
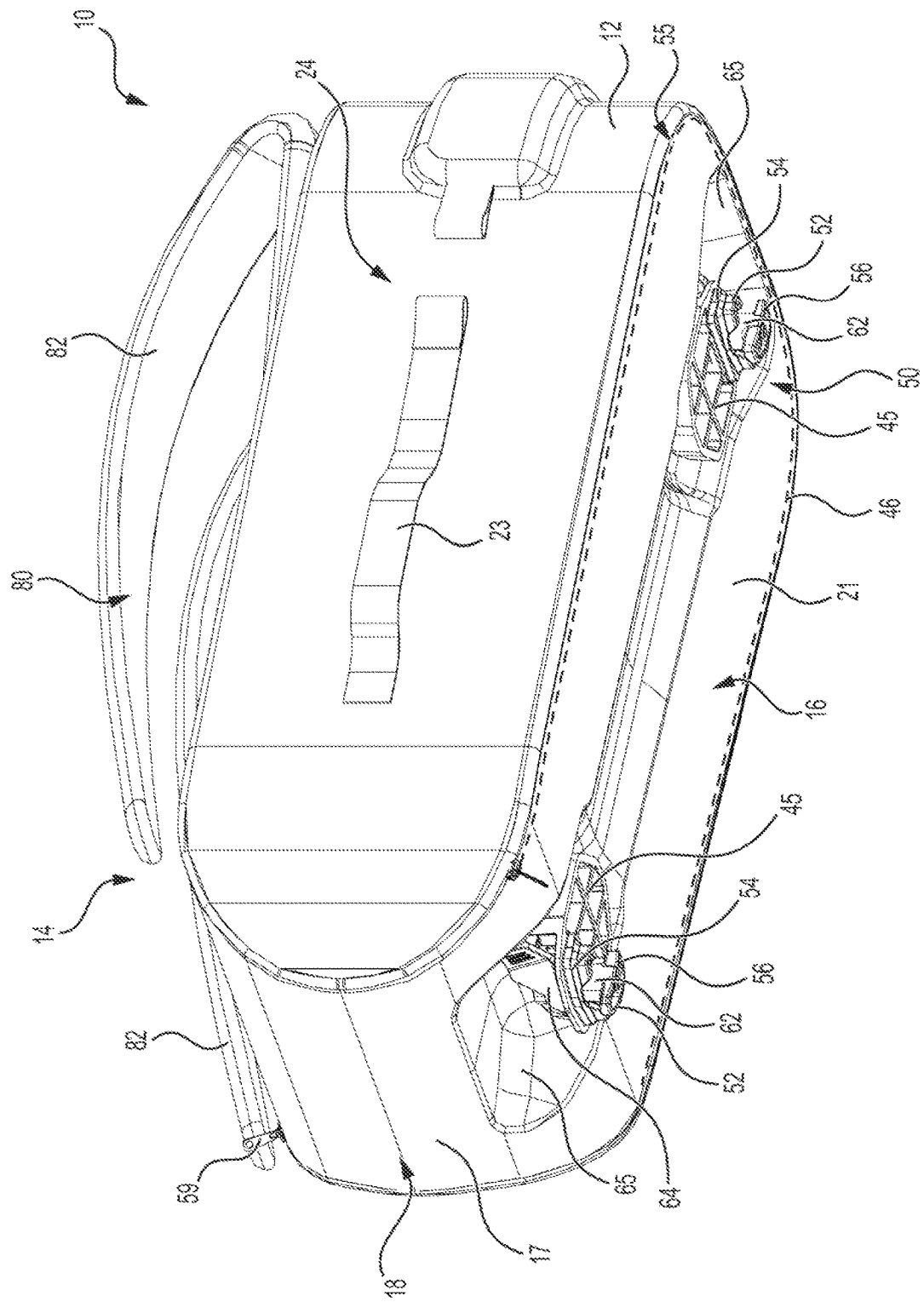
FIG. 7 is a perspective view, taken from a bottom, rear, left side, of the storage container of FIG. 3, with the cover of the storage container removed for clarity and showing anchor locks of a vehicle attachment system of the storage container in a locked position.
Figure 8:
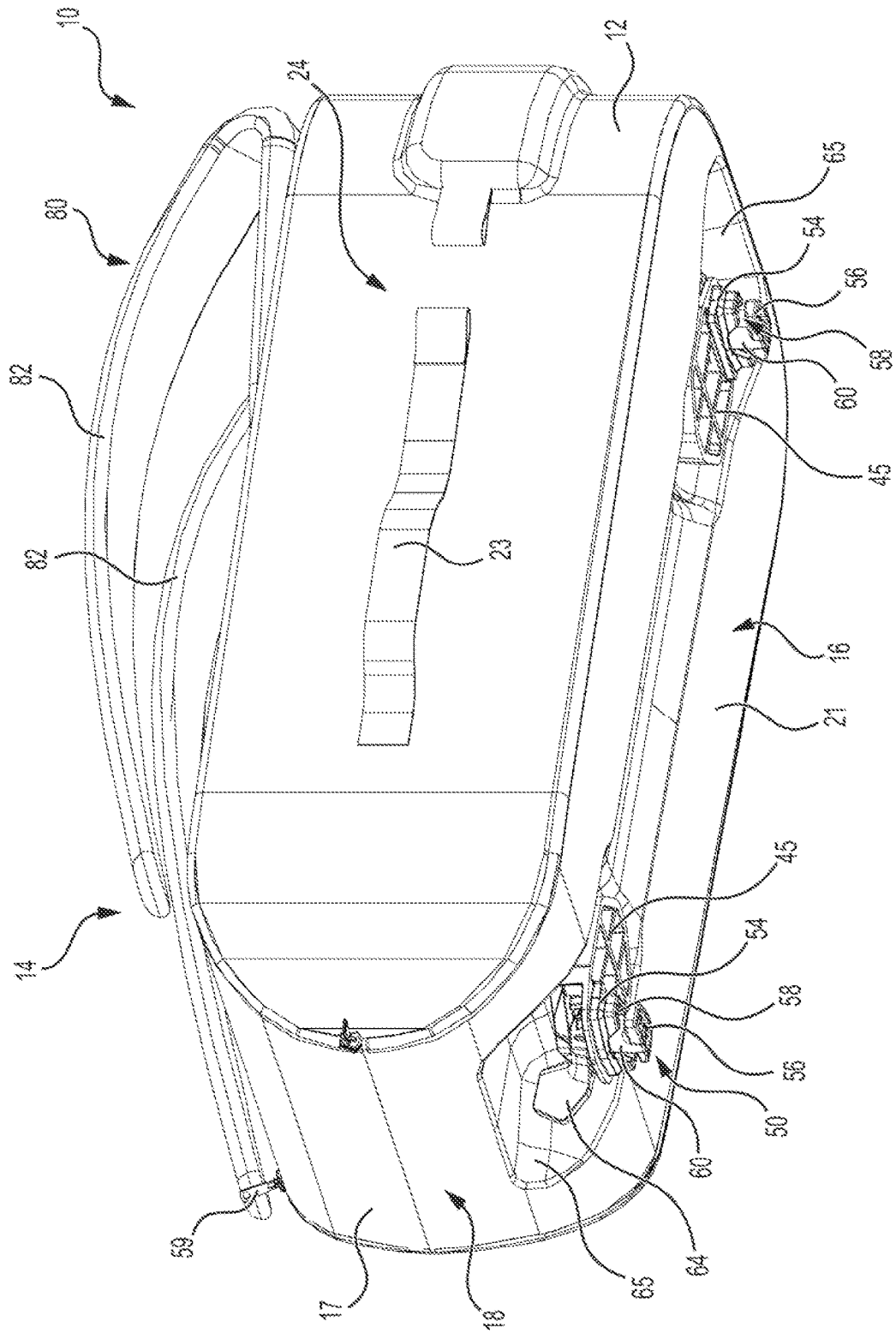
FIG. 8 is a perspective view, taken from a bottom, rear, left side, of the storage container of FIG. 3, with the cover of the storage container removed for clarity and showing the anchor locks of the vehicle attachment system in an unlocked position.

In this embodiment, the attachment features 52 are anchors 52. As best shown in FIGS. 6 to 8, each anchor 52 has a frame 45, an anchor base 54 extending laterally outwardly from the frame 45 and an anchor lock 56 extending below the anchor base 54, spaced therefrom by a gap 58. The anchor lock 56 is connected to the anchor base 54 via a stem 60. A lever 64 is connected to the stem 60 and allows a user to rotate the stem 60 about an axis of the stem 62, thereby rotating the anchor lock 56. In particular, the anchor lock 56 is rotatable about the axis of the stem 62 between locked and unlocked positions. In the unlocked position, which is illustrated in FIG. 8, the anchor lock 56 extends generally parallel to the anchor base 54. In the locked position which is illustrated in FIGS. 6 and 7, the anchor lock 56 is rotated by 90° about the axis of the stem 60 relative to the unlocked position. A more complete description of the mechanism of the anchors 52 can be found in U.S. Pat. No. 9,751,592, issued Sep. 5, 2017, the entirety of which is incorporated by reference herein.

As best shown in FIGS. 6 to 8, in this embodiment, each anchor 52 is connected to the container body 12 via the frame 45. In particular, the frame 45 is fastened to a lower surface 21 of the container body 12 by fasteners 29 which extend through the frame 45 and into respective openings (not shown) which receive the fasteners 29. Moreover, in this embodiment, each anchor 52 is at least partly received within a respective recess 65 defined by the lower surface 21 of the container body 12.

Figure 9:
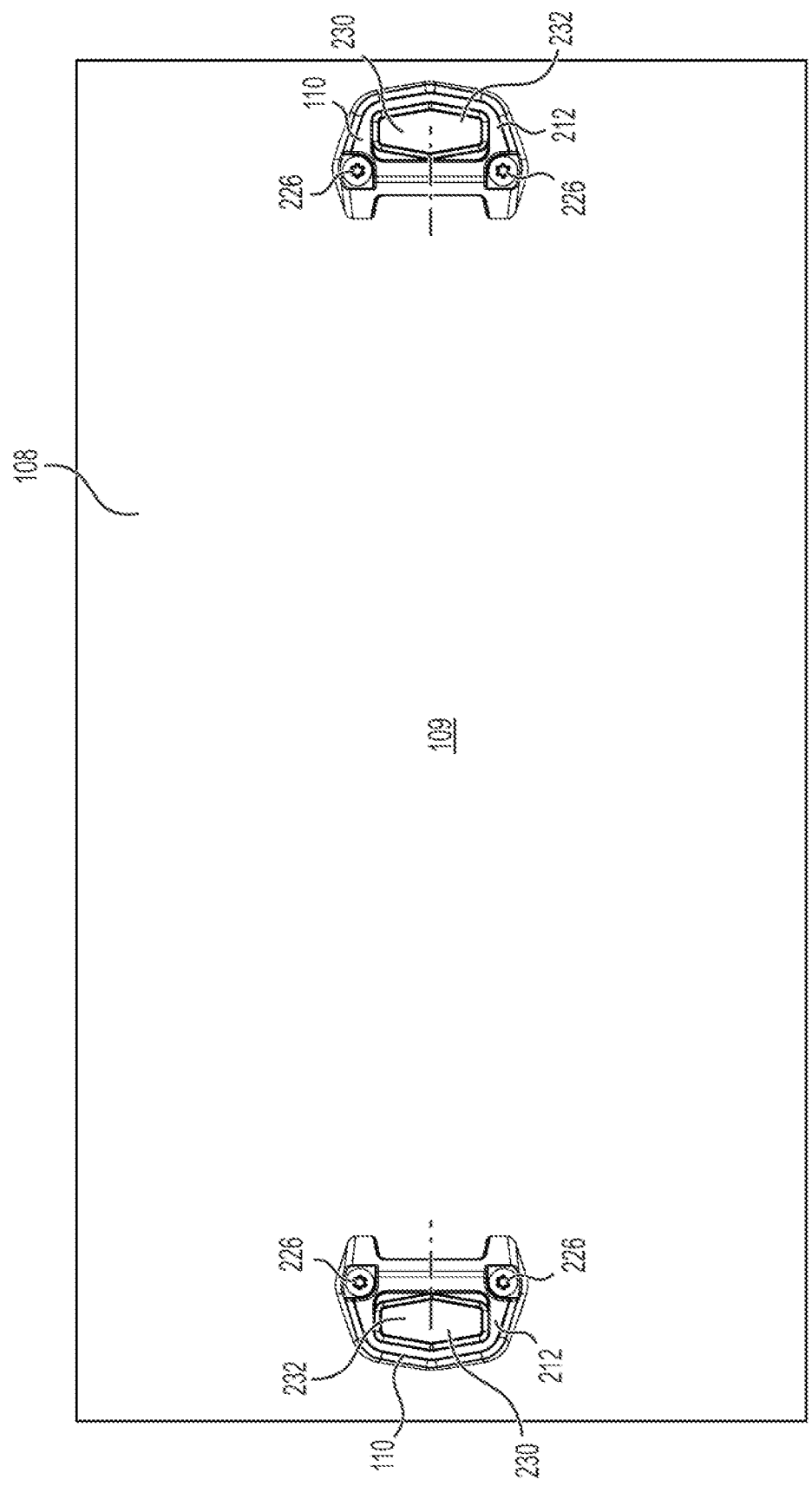
FIG. 9 is a top plan view of a connection base and anchor fixtures of the vehicle of FIG. 1.

The anchors 52 are configured to be received by corresponding attachment features 110 (FIG. 9) that are connected to the vehicle 100. In particular, as shown in FIG. 9, the attachment features 110 are provided on a connection base 108 (also partially shown in FIG. 1) that is connected to the frame 112 of the vehicle 100. As shown in FIG. 1, in this example, the connection base 108 is disposed behind the driver seat 118. In this embodiment, the attachment features 110 are left and right anchor fixtures 110 that are connected to the connection base 108 via fasteners 226. In this embodiment, the left and right anchor fixtures 110 are identical to one another.

Figure 10A:
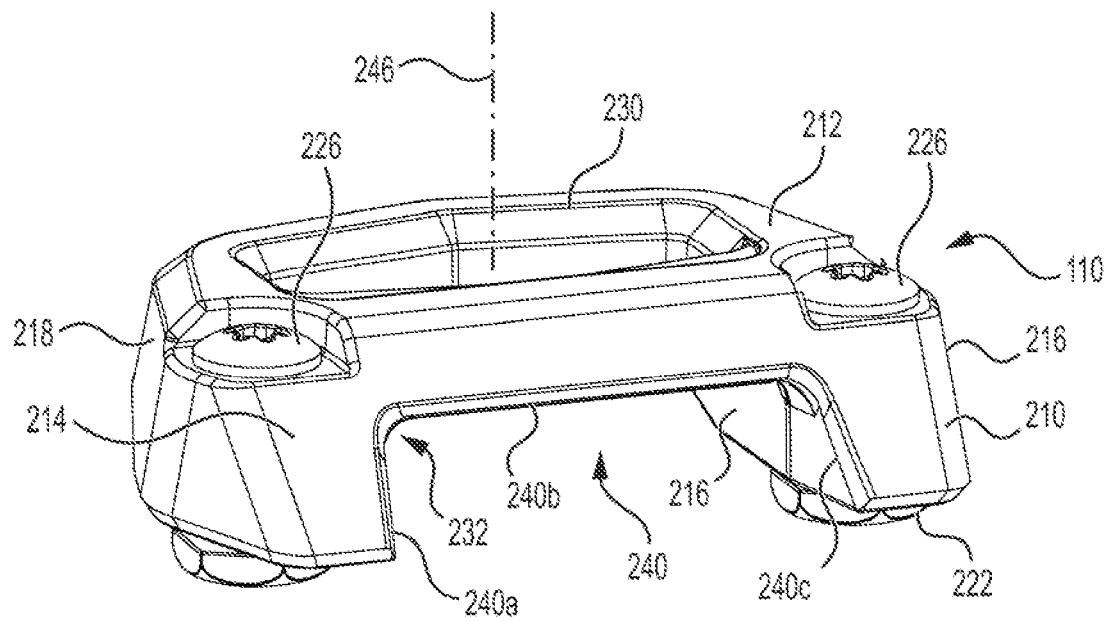
FIG. 10A is a perspective view, taken from a rear, right side, of a left anchor fixture of the vehicle of FIG. 1.
Figure 10B:
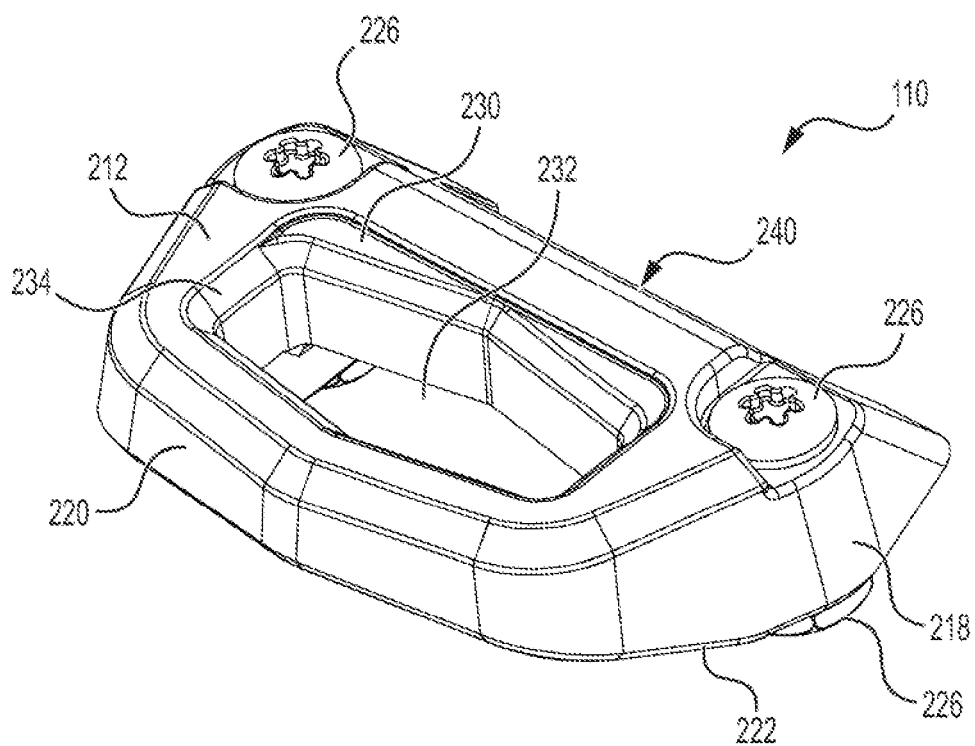
FIG. 10B is a perspective view, taken from a top, rear, left side, of the left anchor fixture of FIG. 10A.
Figure 10C:
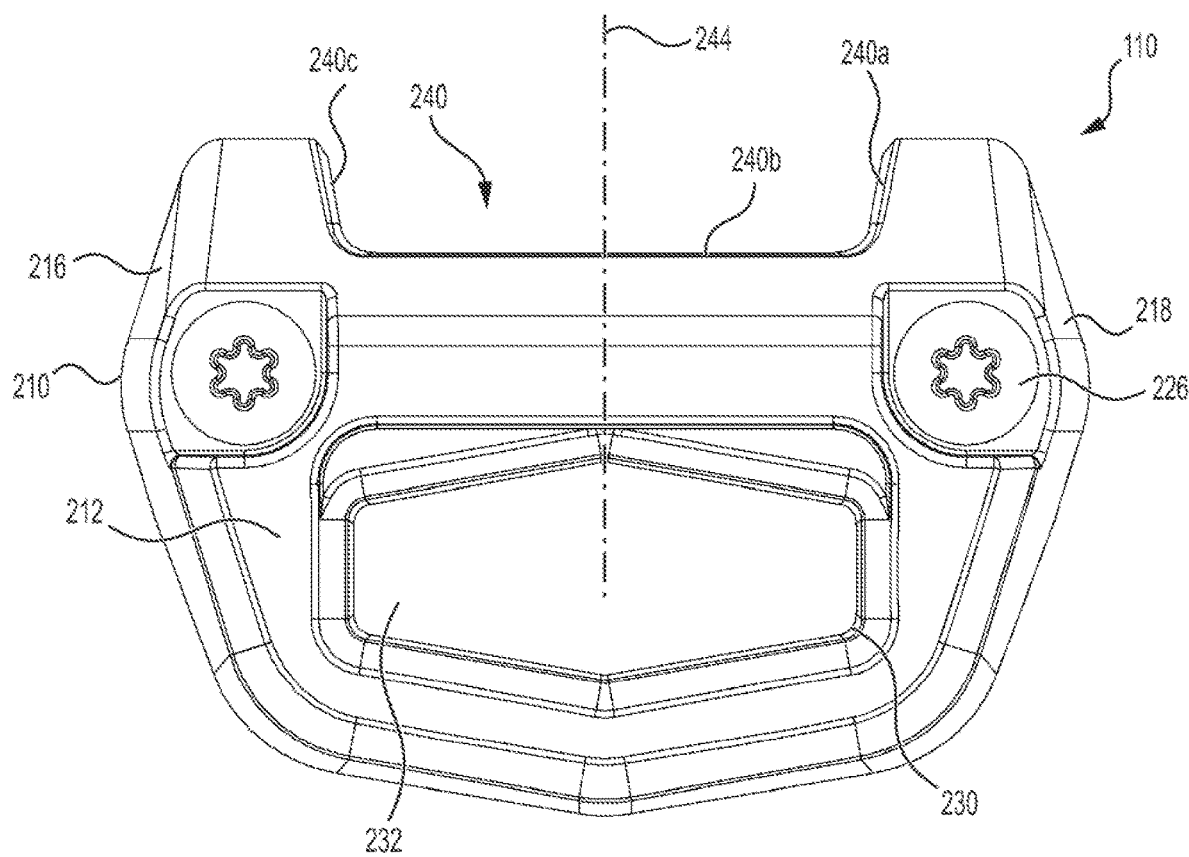
FIG. 10C is a top plan view of the left anchor fixture of FIG. 10A.
Figure 11:
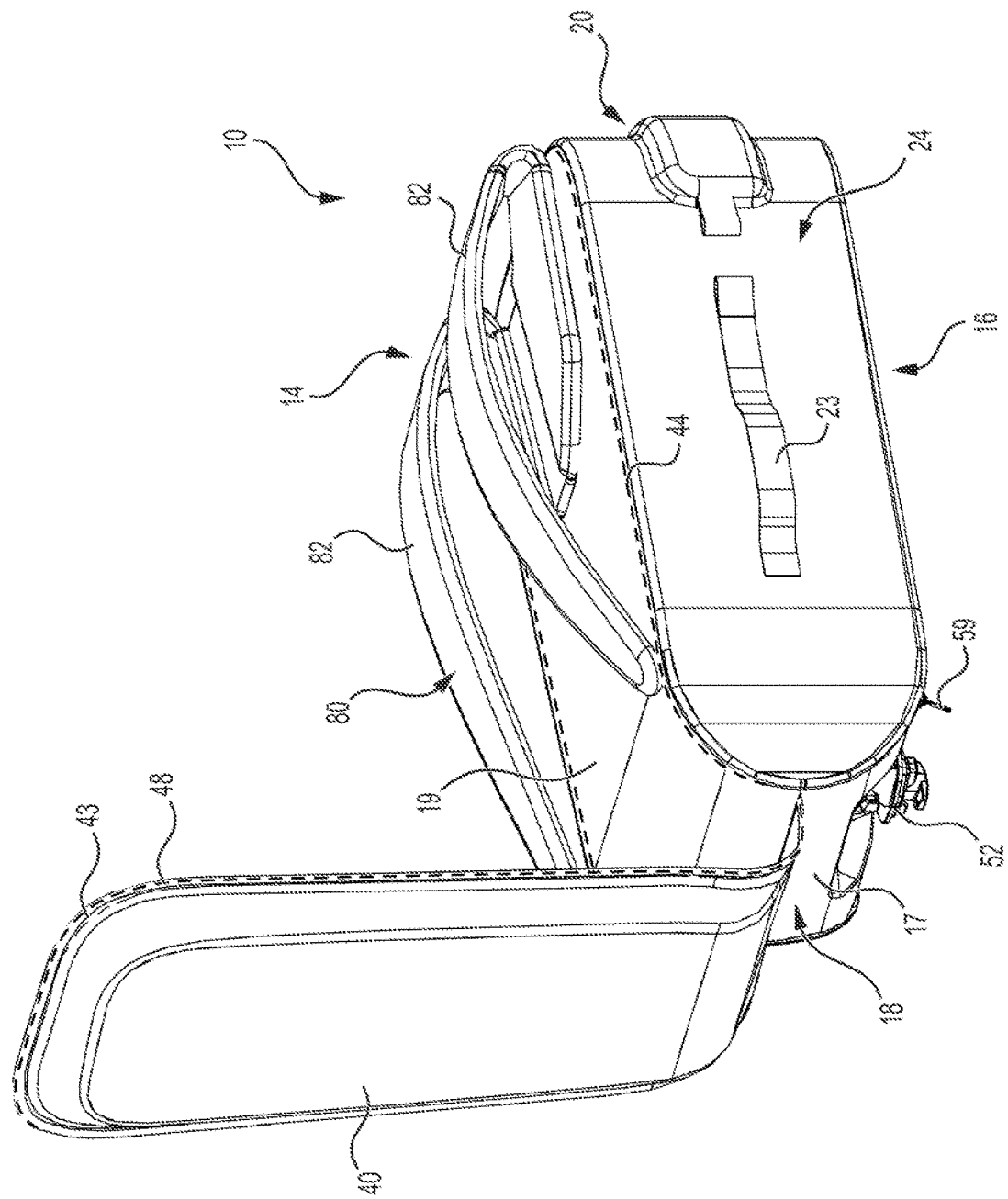
FIG. 11 is a perspective view, taken from a top, rear, left side, of the storage container of FIG. 1, shown with the cover thereof unfastened from a container body of the storage container.
Figure 12:
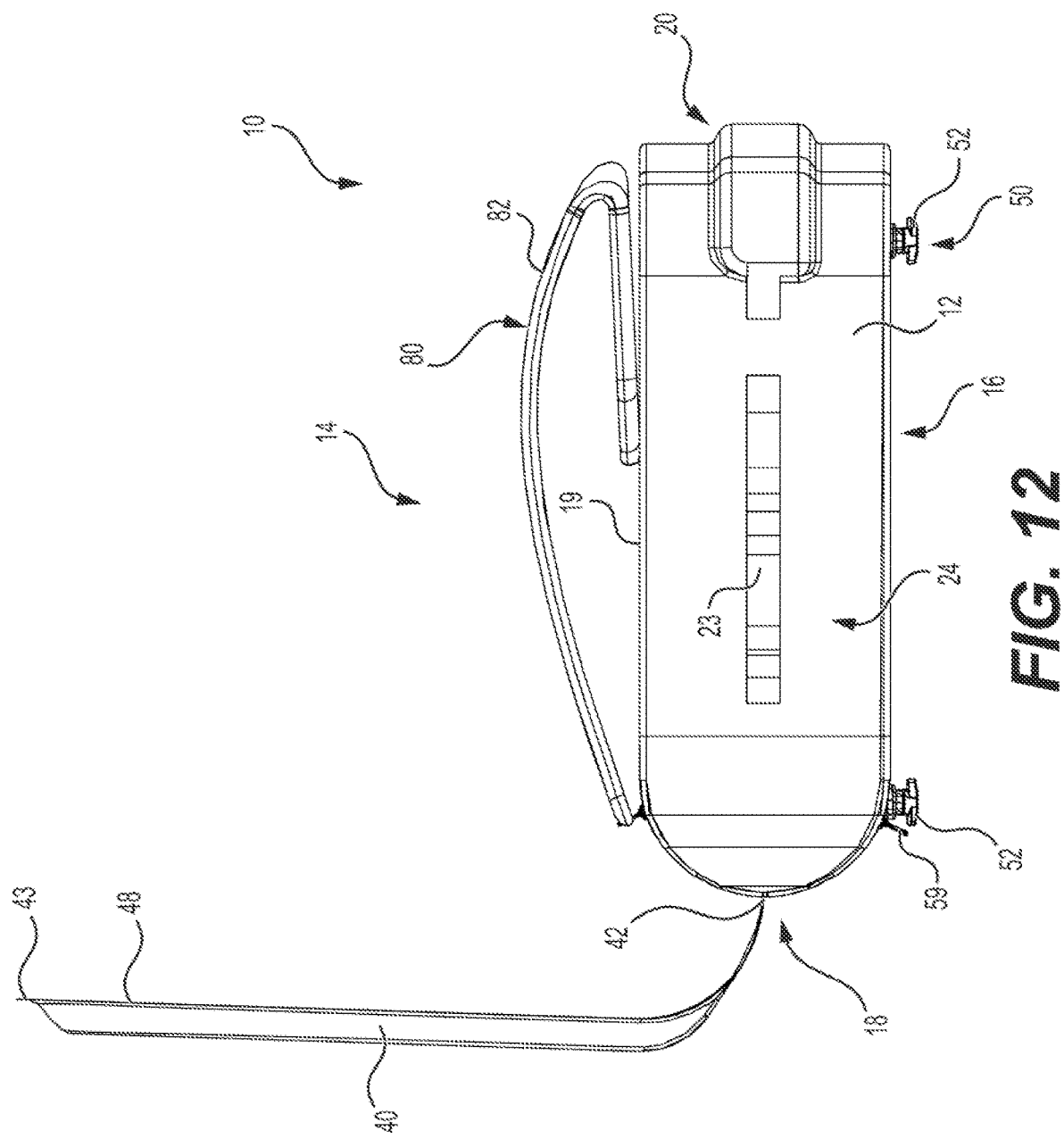
FIG. 12 is a rear elevation view of the storage container of FIG. 11.

With reference to FIGS. 10A to 10C, each anchor fixture 110 has a fixture body 210 having a top portion 212, a front portion 214, a left side portion 216, a right side portion 218 and rear portion 220, each portion having an interior and an exterior surface. The fixture body 210 also has a base 222.

A pair of fasteners 226 inserted through a pair of fastener holes (not shown) in the fixture body 210 are used to secure the anchor fixture 110 into fastener holes (not shown) defined by an upper surface 109 of the connection base 108. An anchor aperture 230 is defined by the top portion 212 of the fixture body 210. The anchor aperture 230 leads downwards through the top portion 212 to an anchor chamber 232 defined by the interior surfaces of the portions 212, 216, 218, 220. The anchor chamber 232, below the anchor aperture 230, extends outwards towards the front portion 214. The front portion 214 defines a fastener aperture 240 that leads into the anchor chamber 232. The fastener aperture 240 in the front surface is generally rectangular and defined by three edges 240a, 240b, 240c of the front surface 214 of the fixture body 210. In this embodiment, the fourth edge of the fastener aperture 240 is defined by the surface on which the anchor fixture 110 is disposed, namely the upper surface 109 of the connection base 108. It is contemplated that the fastener aperture 240 can be defined wholly by the fixture body 210 or by the fixture body 210 and any other surfaces that the anchor fixture 110 may be engaged with. A more complete description of the anchor fixtures 110 can be found in U.S. Pat. No. 9,751,592.

In order to attach the storage container 10 to the vehicle 100, the anchor locks 56 of the vehicle attachment system 50 are inserted, in their unlocked positions, into the respective anchor chambers 252 of the anchor fixtures 110 via the anchor apertures 230. The levers 64 of the anchors 52 are then actuated to rotate the anchor locks 56 to their locked positions. In the locked position of each anchor lock 56, the anchors 52 are retained by the corresponding anchor fixtures 110. As such, the storage container 10 is prevented from being removed from the vehicle 100. If the user then wants to remove the storage container 10 from the vehicle 100, the anchor locks 56 are rotated to their unlocked positions via the levers 64 and the anchor locks 56 can then be removed from the respective anchor chambers 232 through the anchor apertures 230.

It is contemplated that, in other embodiments, the anchor fixtures 110 could be replaced by different types of attachment features. For instance, in some embodiments, the connection base 108 could define apertures shaped like the anchor apertures 230 for receiving the anchor locks 56.

Furthermore, it is contemplated that, in other embodiments, one of the anchors 52 of the vehicle attachment system 50 could be replaced by a different type of attachment feature. For example, in some embodiments, one of the anchors 52 could be replaced by a tongue fastener that is inserted into the anchor chamber 232 of one of the anchor fixtures 210 through the corresponding fastener aperture 240 thereof. Such a configuration of the vehicle attachment system is disclosed in detail in in U.S. Pat. No. 9,751,592.

It is contemplated that the vehicle attachment system 50 could be configured differently in other embodiments.

Figure 4:
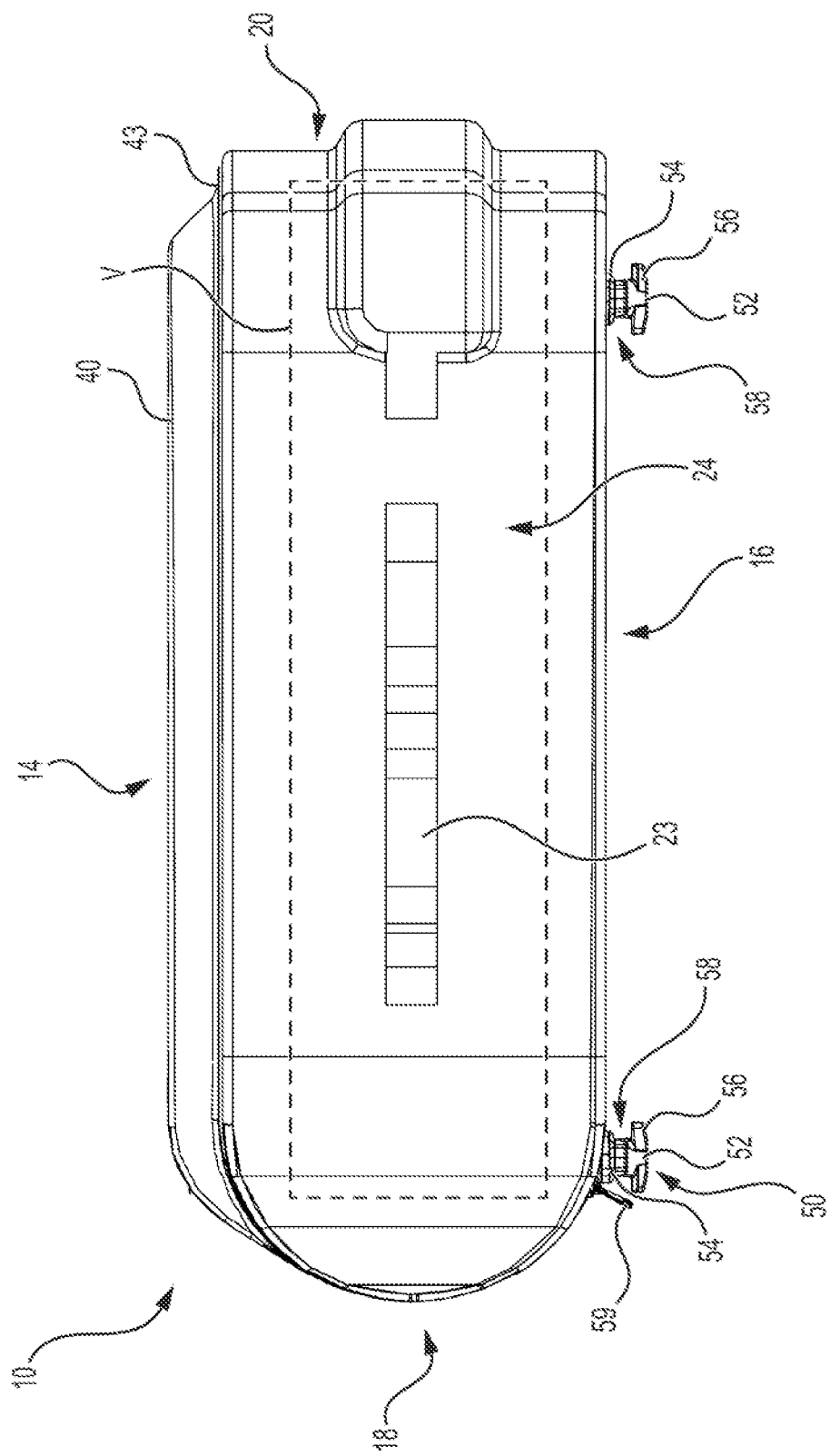
FIG. 4 is a rear elevation view of the storage container of FIG. 3.
Figure 13:
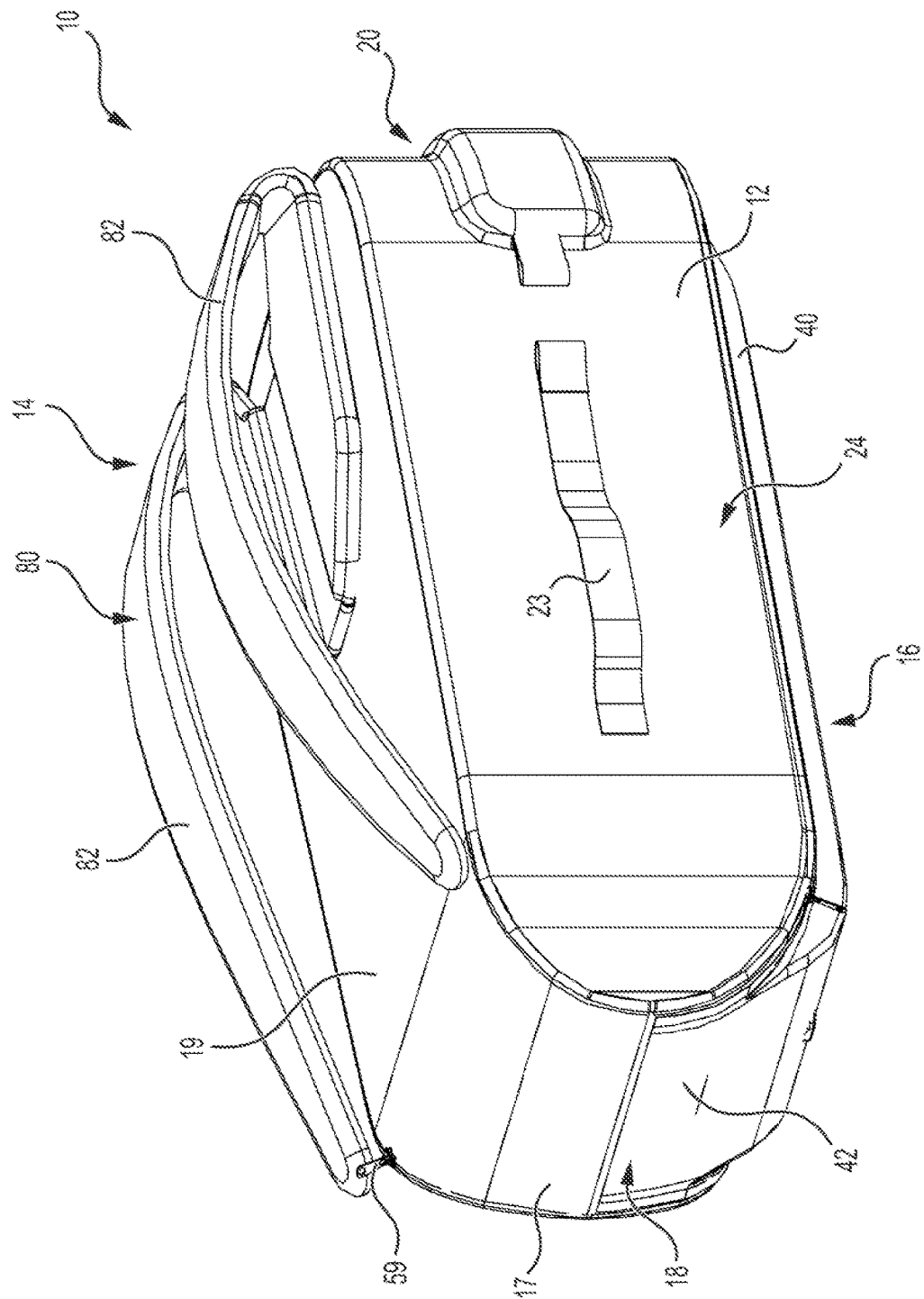
FIG. 13 is a perspective view, taken from a top, rear, left side, of the storage container of FIG. 1, showing the cover in a lower position.
Figure 14:
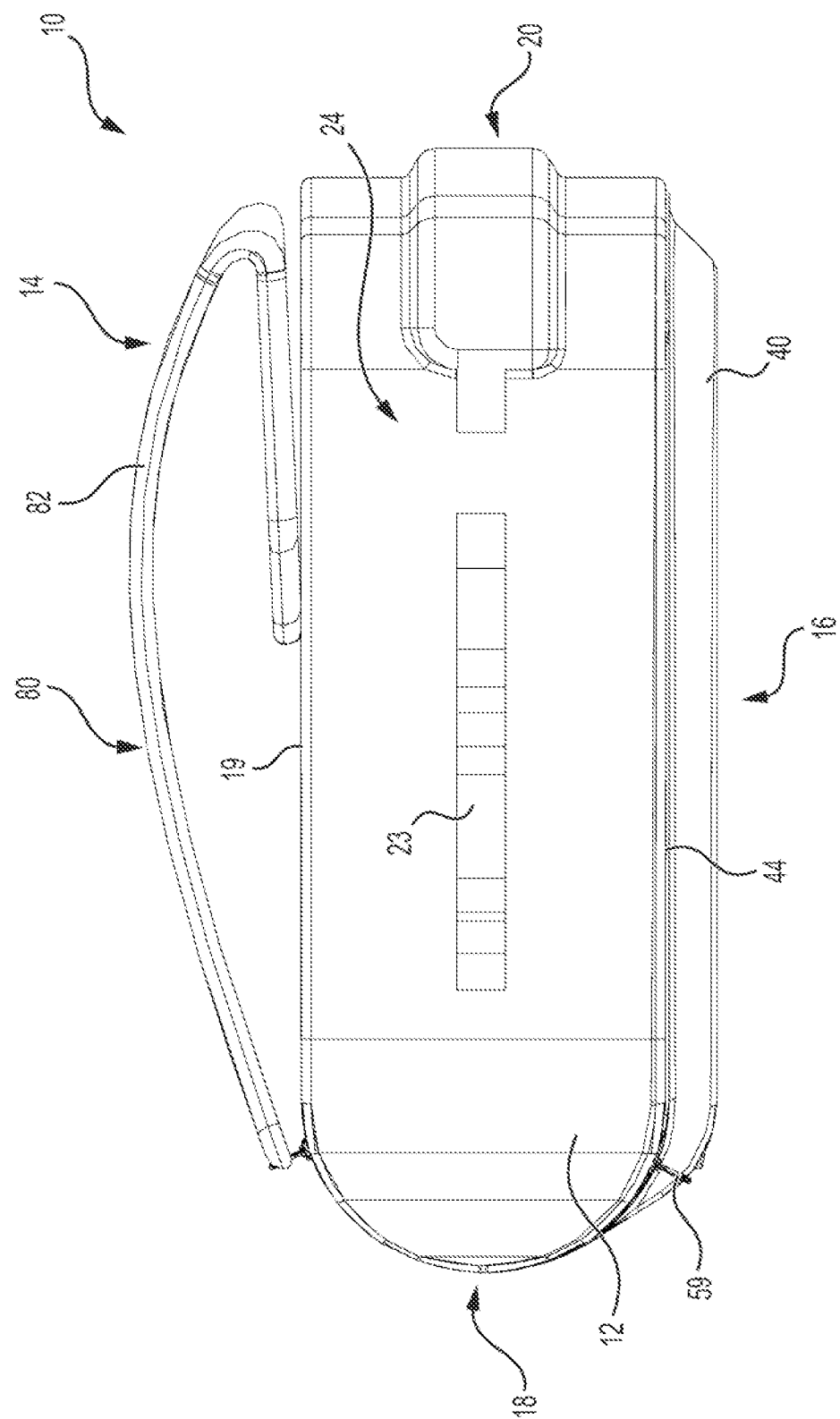
FIG. 14 is a rear elevation view of the storage container of FIG. 13.
Figure 15:
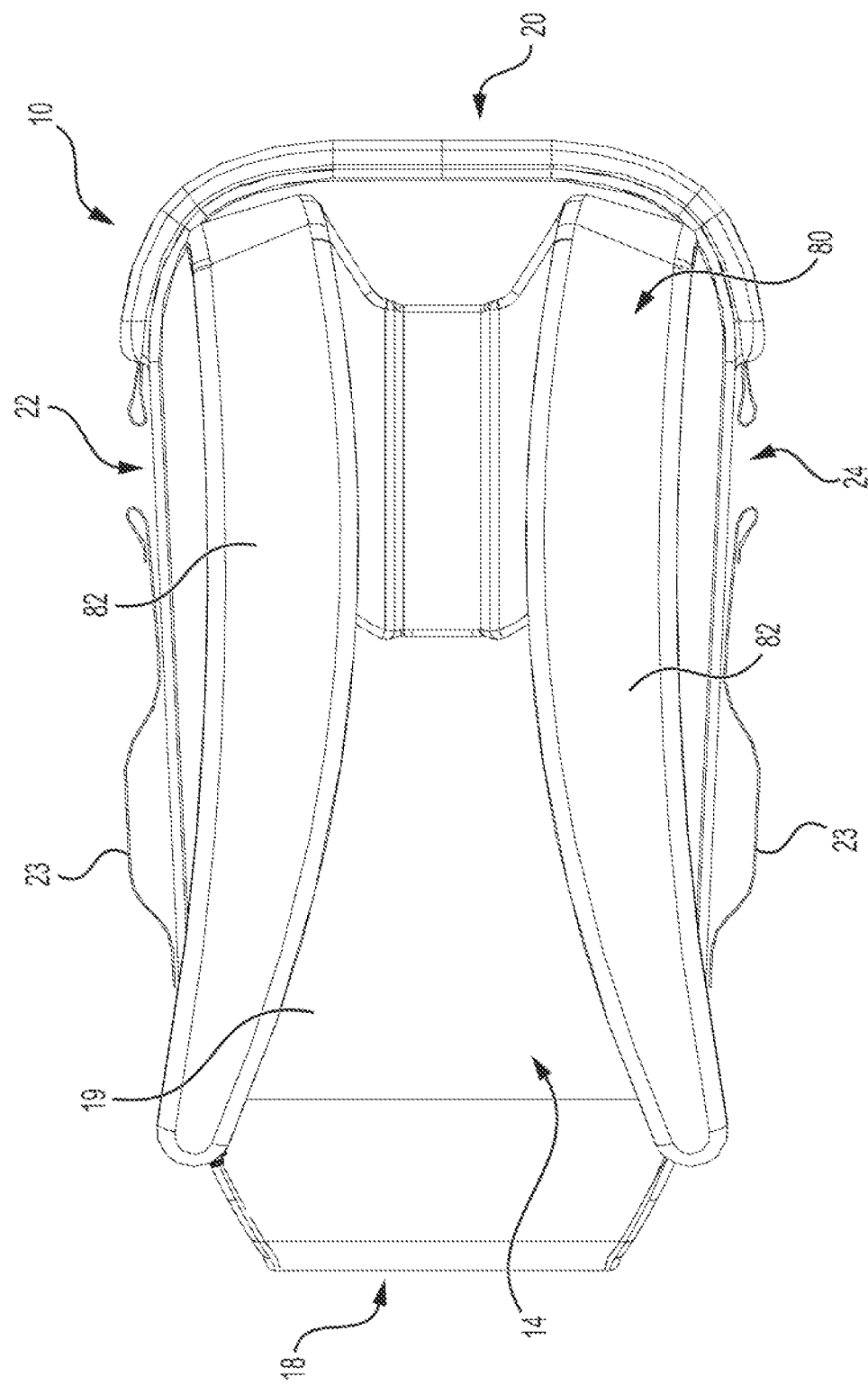
FIG. 15 is a top plan view of the storage container of FIG. 13.

With reference to FIGS. 13 to 15, the storage container 10 also has a user attachment system 80 for attaching the storage container 10 to the user 200. The user attachment system 80 is disposed on the upper side 14 of the storage container 10. In this embodiment, the user attachment system 80 has two attachment features 82, different from the anchors 52, for attaching the storage container 10 to the user 200. As will be appreciated, the attachment features 82 are disposed on the opposite side of the storage container 10 from the anchors 52. As such, as shown in FIG. 4, the internal volume V of the storage container 12 is disposed between the attachment features 82 and the anchors 52. In this embodiment, the attachment features 82 are shoulder straps 82 connected to an upper surface 19 of the container body 12. For instance, the shoulder straps 82 could be sewn, welded (e.g., ultrasonically welded), or otherwise fastened to the upper surface 19. The shoulder straps 82 are oriented so as to extend generally laterally (i.e., in a direction from the left side 18 to the right side 20 of the storage container 10). As shown in FIG. 2, the shoulder straps 82 are configured to be looped around the user's arms 202 to attach the storage container 10 on the user's back. The storage container 10 is thus usable as a backpack, providing a simple and reliable way to carry the storage container 10 when it is detached from the vehicle 100.

Figure 21:
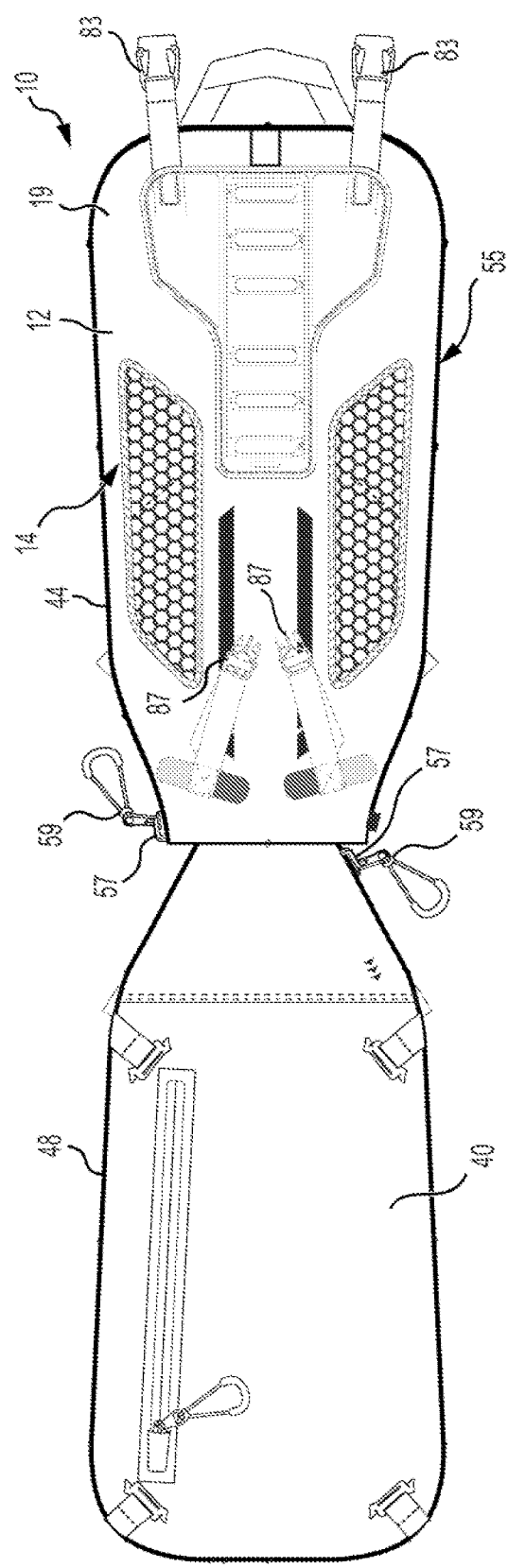
FIG. 21 is a top plan view of the storage container according to an alternative embodiment in which a user attachment system thereof is partially selectively detachable, and shown with the cover thereof unfastened from the container body of the storage container.
Figure 24:
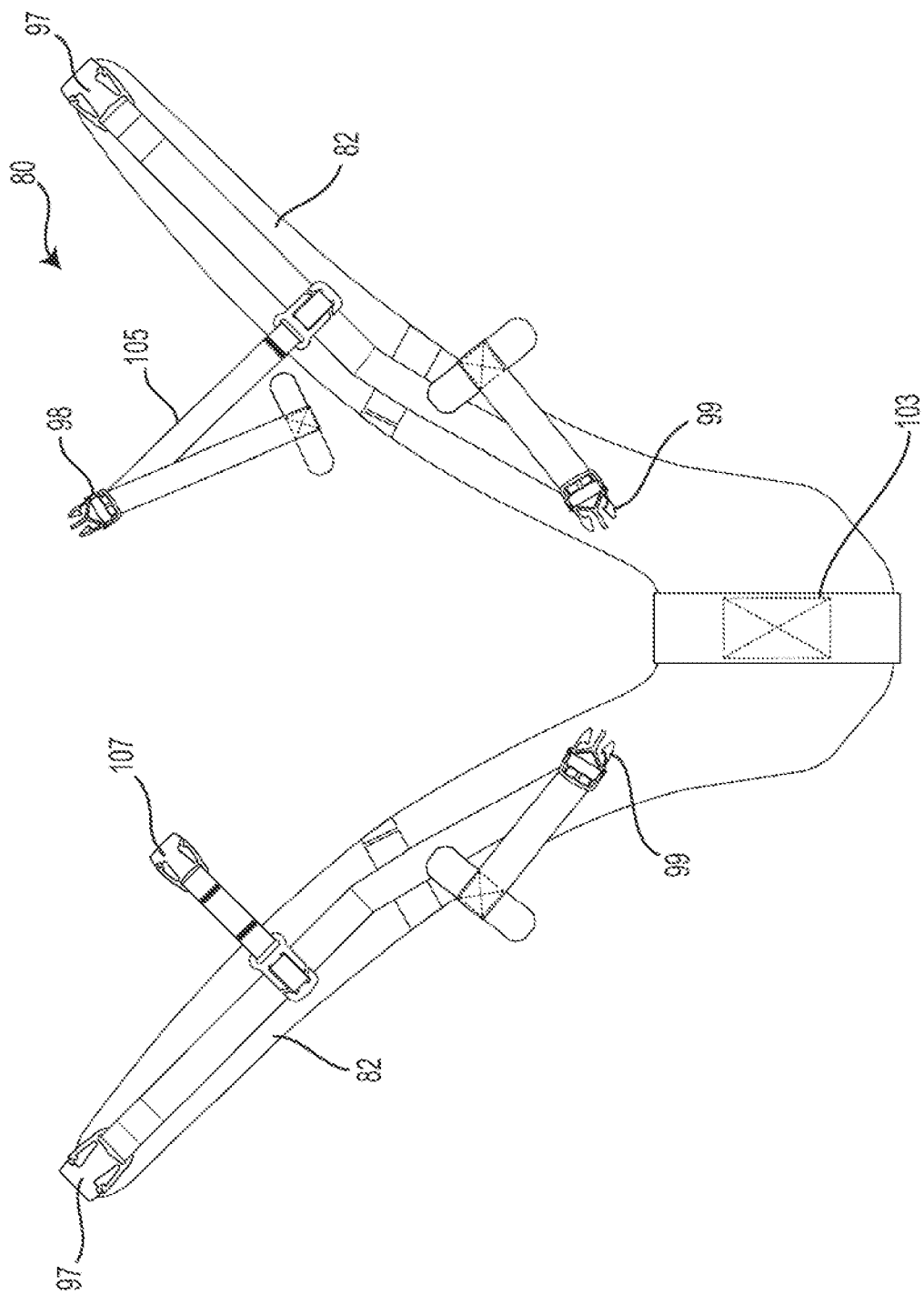
FIG. 24 is a top plan view of the user attachment system of the storage container of FIG. 21.

It is contemplated that the user attachment system 80 could be configured differently in other embodiments. For instance, in some embodiments, the user attachment system 80 could be partially or entirely detachably connected to the container body 12 of the storage container 10. In particular, as shown in FIG. 21, in an alternative embodiment, buckles 87 are disposed on the upper side 14 of the storage container 10 for selectively connecting respective left ends of the shoulder straps 82 to the container body 12. In this example, the buckles 87 are male buckles that are disposed near the left end of the container body 12. Notably, with reference to FIG. 24, the left ends of the shoulder straps 82 are provided with female buckles 97 that are selectively fastened with the male buckles 87. The left (free) ends of the shoulder straps 82 may thus be connected or disconnected to the container body 12 via the buckles 87, 97. This may facilitate storing the shoulders straps 82 when the cover 40 is positioned to cover the upper side 14 of the storage container 10. In this example, although the right ends of the shoulder straps 82 are fastened (e.g., sewn or removably attached) to the container body 12 at a central portion 103 (FIG. 24), right end buckles 83 are also disposed on the upper side 14 of the storage container 10, spaced from the buckles 87, to attach the right ends of the shoulder straps 82 thereto. In particular, as shown in FIG. 24, the right ends of the shoulder straps 82 are provided with male buckles 99 that are selectively fastened with the female buckles 83. Attaching the shoulder straps 82 to the container body 102 via the buckles 83, 99 can help support the storage container 10 on the shoulders of the user. In addition, as shown in FIG. 24, an adjustable strap 105 extends from one of the shoulder straps 82 and is provided with a male chest buckle 98 which is selectively connected to a female chest buckle 107 that is connected to the other shoulder strap 82. The length of the strap 105 can be selectively adjusted via the male chest buckle 98 to tighten the shoulder straps 82 around a user's chest.

It is contemplated that, in some embodiments, the shoulder straps 82 may be entirely removable from the container body 12. This may allow the user to remove the user attachment system 80 for instance if the user wishes to use the storage container 10 solely for transport on the vehicle 100.

With reference now to FIGS. 3 to 5 and 11 to 14, the storage container 10 is provided with a cover 40 which is movable to selectively cover the vehicle attachment system 50 and the user attachment system 80. In particular, in this embodiment, the cover 40 is flipped, about a fixed end 42 thereof connected to a left side surface 17 of the container body 12, between an upper position on the container body 12, illustrated in FIGS. 3 to 5, in which the cover 40 is covering the shoulder straps 82 of the user attachment system 80 and a lower position, illustrated in FIGS. 13 and 14, in which the cover 40 is covering the anchors 52 of the vehicle attachment system 50.

Figure 17:
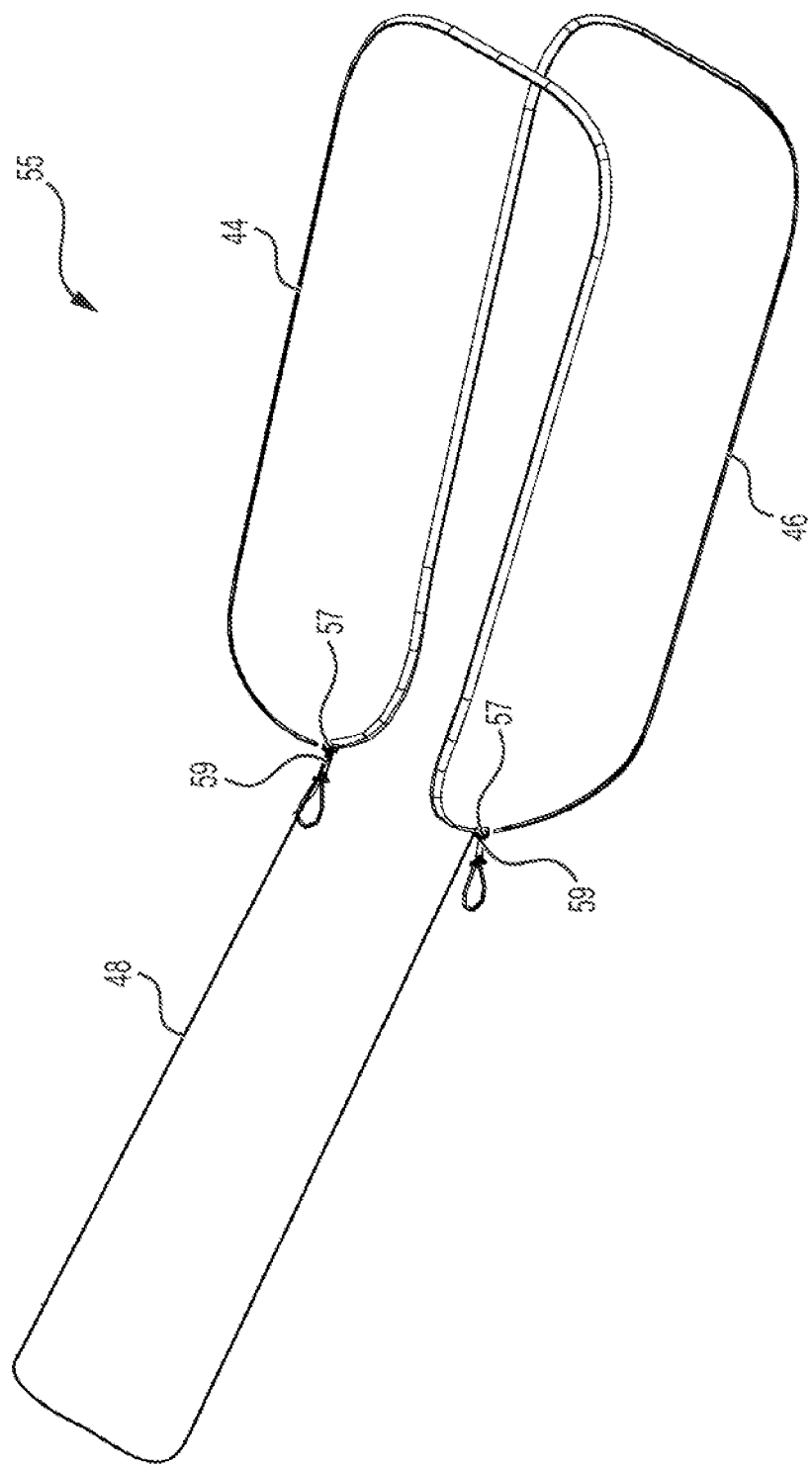
FIG. 17 is a perspective view, taken from a top, rear, right side, of a fastening system of the storage container shown in isolation for clarity.
Figure 22:
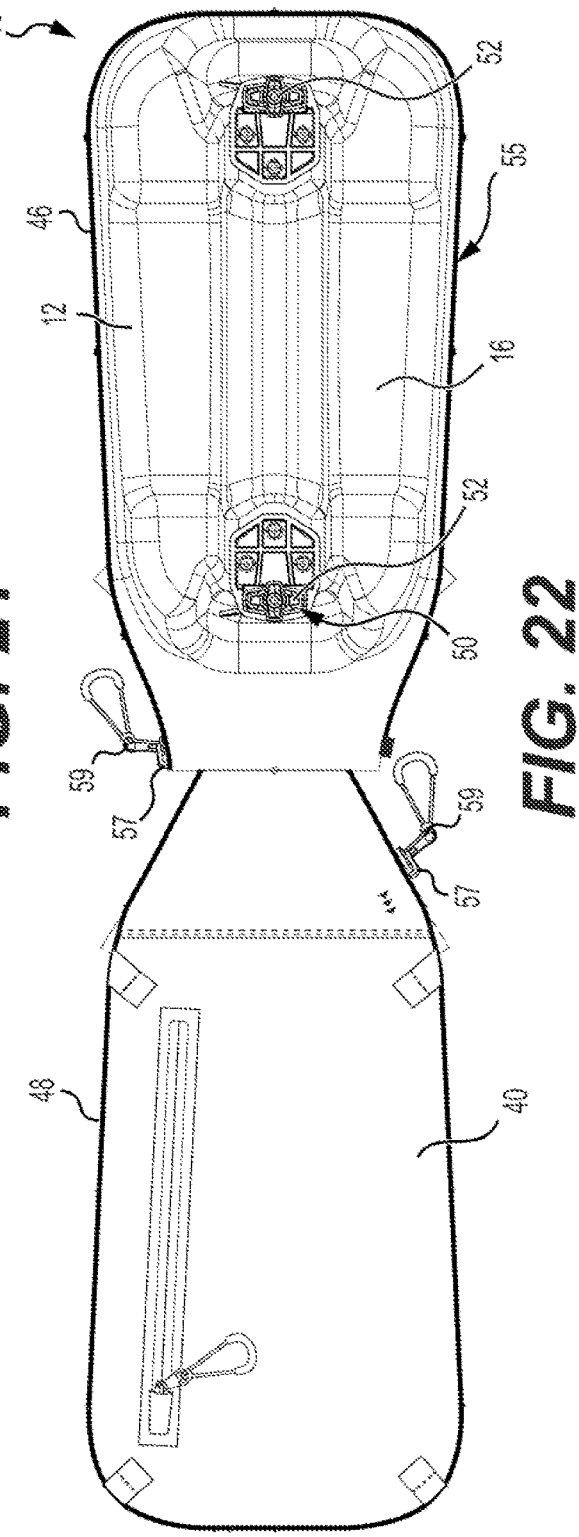
FIG. 22 is a bottom plan view of the storage container of FIG. 21, shown with the cover thereof unfastened from the container body of the storage container.

As best shown in FIGS. 17, 21 and 22, a fastening system 55 is provided to secure the cover 40 to the container body 12 in the upper and lower positions. Notably, an upper cover fastening feature 44 and a lower cover fastening feature 46 are provided on the container body 12 to fasten the cover 40 thereto in the upper and lower positions respectively. In this embodiment, the fastening system 55 is a zip fastener system such that the upper and lower cover fastening features 44, 46 are upper and lower zip fastener tracks 44, 46 connected to the container body 12. The upper zip fastener track 44 is connected to the container body 12 on the upper side 14 of the storage container 10 and the lower zip fastener track 46 is connected to the container body 12 on the lower side 16 of the storage container 10. The fastening system 55 also includes a peripheral zip fastener track 48 disposed around a periphery 43 of the cover 40 and fastenable with either of the upper and lower zip fastener tracks 44, 46. In this embodiment, each of the zip fastener tracks 44, 46, 48 describes a generally U-shaped path.

Figure 18:
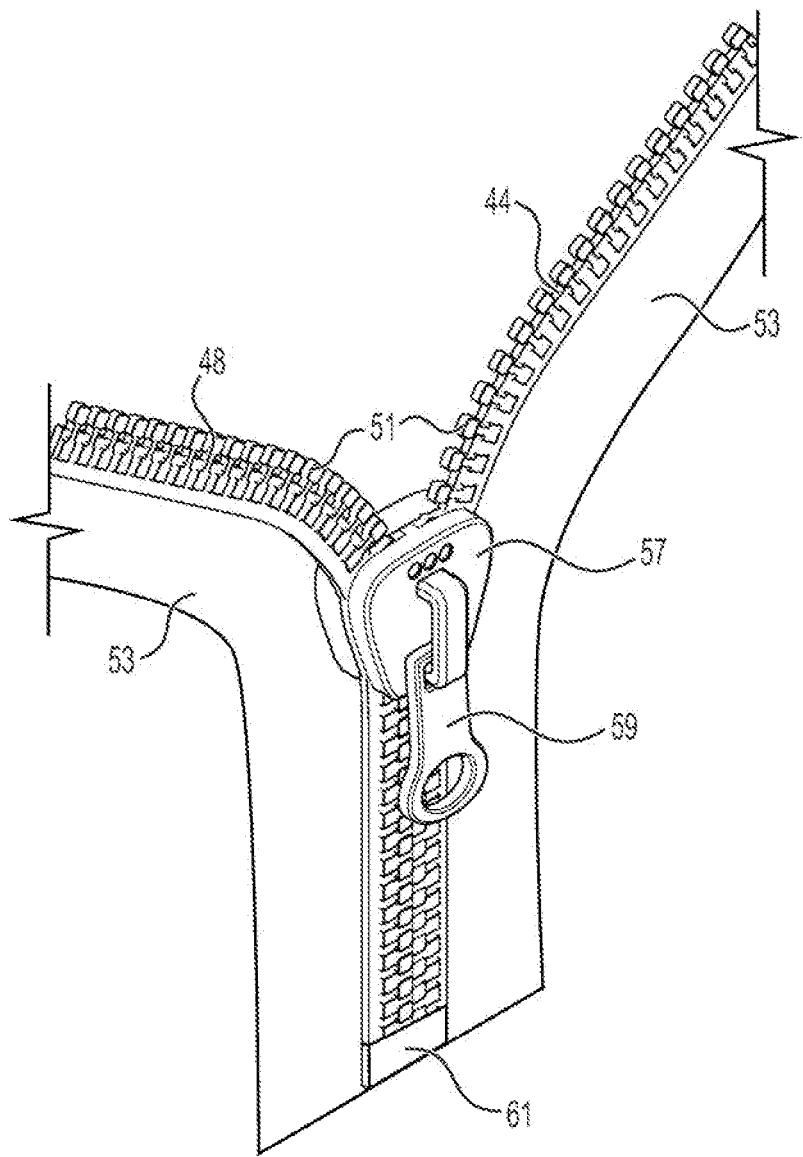
FIG. 18 is a perspective view of parts of an upper zip fastener track and a peripheral zip fastener track of the fastening system of FIG. 17.

An example of parts of the upper zip fastener track 44 and the peripheral zip fastener track 48 is shown in FIG. 18. It should be understood that the lower zip fastener track 46 is configured similarly and is engageable with the peripheral zip fastener track 48 in the same manner. As can be seen, each of the zip fastener tracks 44, 48 has a plurality of teeth 51 (sometimes referred to as "elements"). In this embodiment, the teeth 51 of each of the zip fastener tracks 44, 48 are connected to a tape member 53 which is in turn connected to the container body 12 for the upper zip fastener tracks 44 or to a body of the cover 40 for the peripheral zip fastener track 48. The teeth 51 of the upper zip fastener track 44 and the teeth 51 of the peripheral zip fastener track 48 are meshed with each other by a slider 57. Notably, the slider 57 is slidable over the teeth 51, along a length of the upper zip fastener track 44 and a length of the peripheral zip fastener track 48 for selectively fastening the upper zip fastener track 44 to the peripheral zip fastener track 48. In a closed position of the slider 57, the upper zip fastener track 44 is fastened to the peripheral zip fastener track 48 along the lengths thereof such that the cover 40 is in the upper position (FIGS. 3 to 5) covering the user attachment system 80. A pull 59 is connected to the slider 57 for pulling by the user's fingers in order to actuate the slider 57. A bottom stop 61 prevents the slider 57 from entirely disengaging the upper and peripheral zip fastener tracks 44, 48.

As will be appreciated, the lower zip fastener track 46 is also fastenable with the peripheral zip fastener track 48 in the same manner via another slider 57 which joins or separates their respective teeth 51 such that, in a closed position of that slider 57, the lower zip fastener track 46 is fastened to the peripheral zip fastener track 48 along the lengths thereof such that the cover 40 is in the lower position (FIGS. 13, 14) covering the vehicle attachment system 50.

Figure 19:
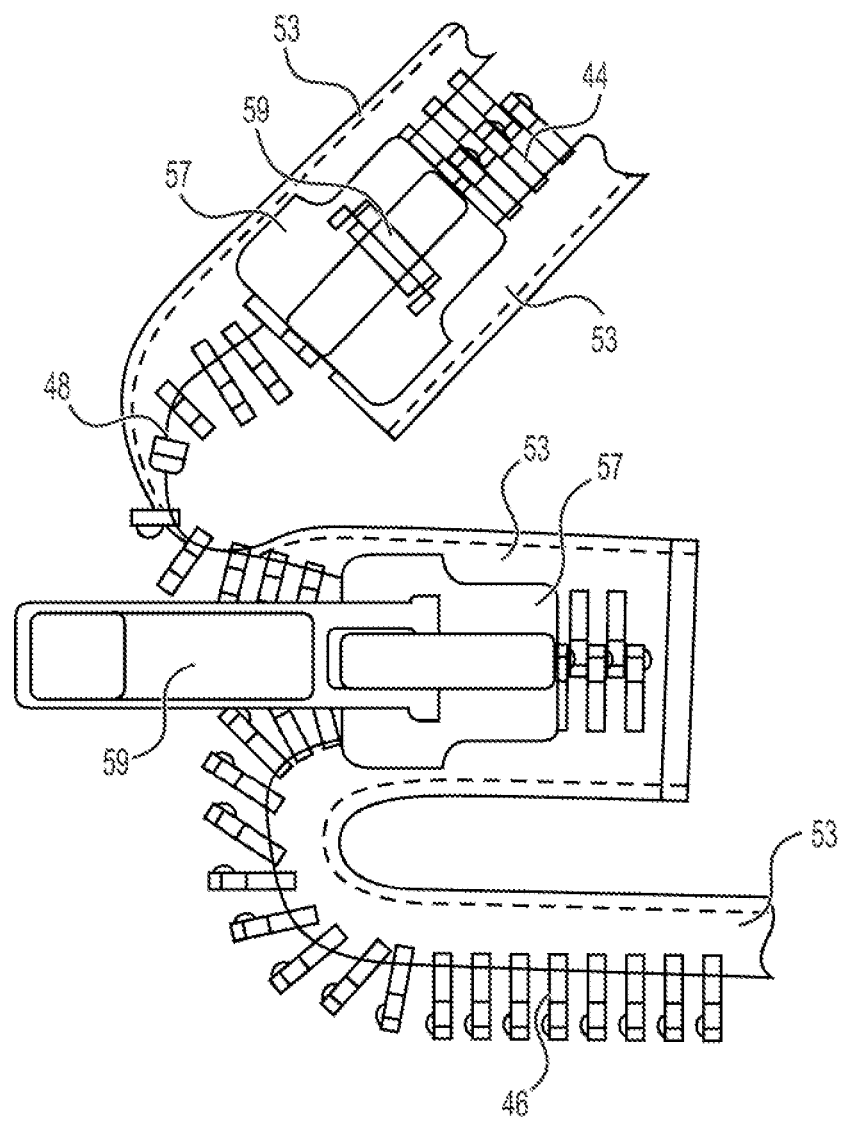
FIG. 19 is a rear elevation view of parts of the upper zip fastener track, a lower zip fastener track and the peripheral zip fastener track of the fastening system of FIG. 17, showing an upper slider of the fastening system in a closed position and a lower slider of the fastening system in an open position.
Figure 20:
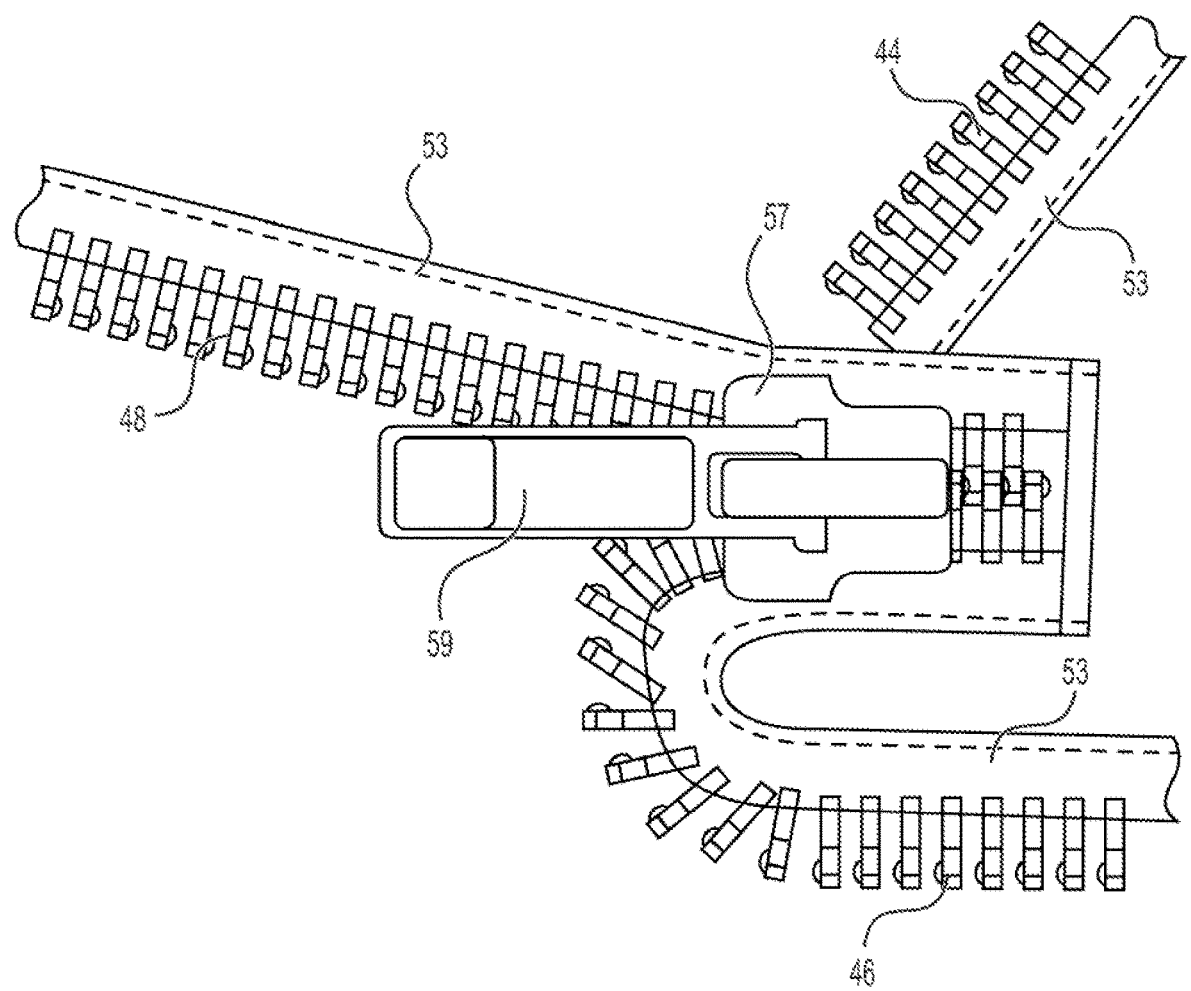
FIG. 20 is a rear elevation view of parts of the upper zip fastener track, the lower zip fastener track and the peripheral zip fastener track of FIG. 17, showing the peripheral zip fastener track unfastened from the upper and lower zip fastener tracks.

In this embodiment, the peripheral zip fastener track 48 thus always remains engaged with both the upper and lower zip fastener tracks 44, 46. However, when the slider 57 that engages the upper and peripheral zip fastener tracks 44, 48 (which can be referred to as the "upper slider" 57) is in the closed position, the other slider 57 (hereinafter the "lower slider") is in an open position in which a majority or an entirety of the lower zip fastener track 46 is unfastened from the peripheral zip fastener track 48 in order to allow the cover 40 to be folded toward the opposite side of the storage container 10. This is illustrated for example in FIG. 19 which illustrates corresponding end portions of the upper, lower and peripheral zip fastener tracks 44, 46, 48. In FIG. 19, the lower slider 57 (which engages the lower and peripheral zip fastener tracks 46, 48) is shown in the open position, and the upper slider 57 is shown in the closed position such that the upper and peripheral zip fastener tracks 44, 48 are fastened to one another along a majority of their respective lengths. In FIG. 20, the lower slider 57 is still in the open position and the upper slider 57 (not illustrated in FIG. 20) is also in its open position such that the peripheral zip fastener track 48 is unfastened from both the upper and lower zip fastener tracks 44, 46.

Similarly, when the lower slider 57 is in the closed position, the upper slider 57 is in an open position in which a majority or an entirety of the upper zip fastener track 44 is unfastened from the peripheral zip fastener track 48.

It is contemplated that, in other embodiments, the peripheral zip fastener track 48 could be entirely disengaged from both the upper and lower zip fastener tracks 44, 46. For instance, in such embodiments, the bottom stops 61 of each of the zip fastener tracks would be omitted and upper and lower insert pins could be provided at opposite ends of the peripheral zip fastener track 48 so that the peripheral zip fastener track 48 can be inserted and removed from the upper and lower sliders 57.

As will be appreciated, the fastening system 55 as described above has few components and therefore is easy to use and can be inexpensive to implement while offering few possibilities for malfunction.

Figure 23:
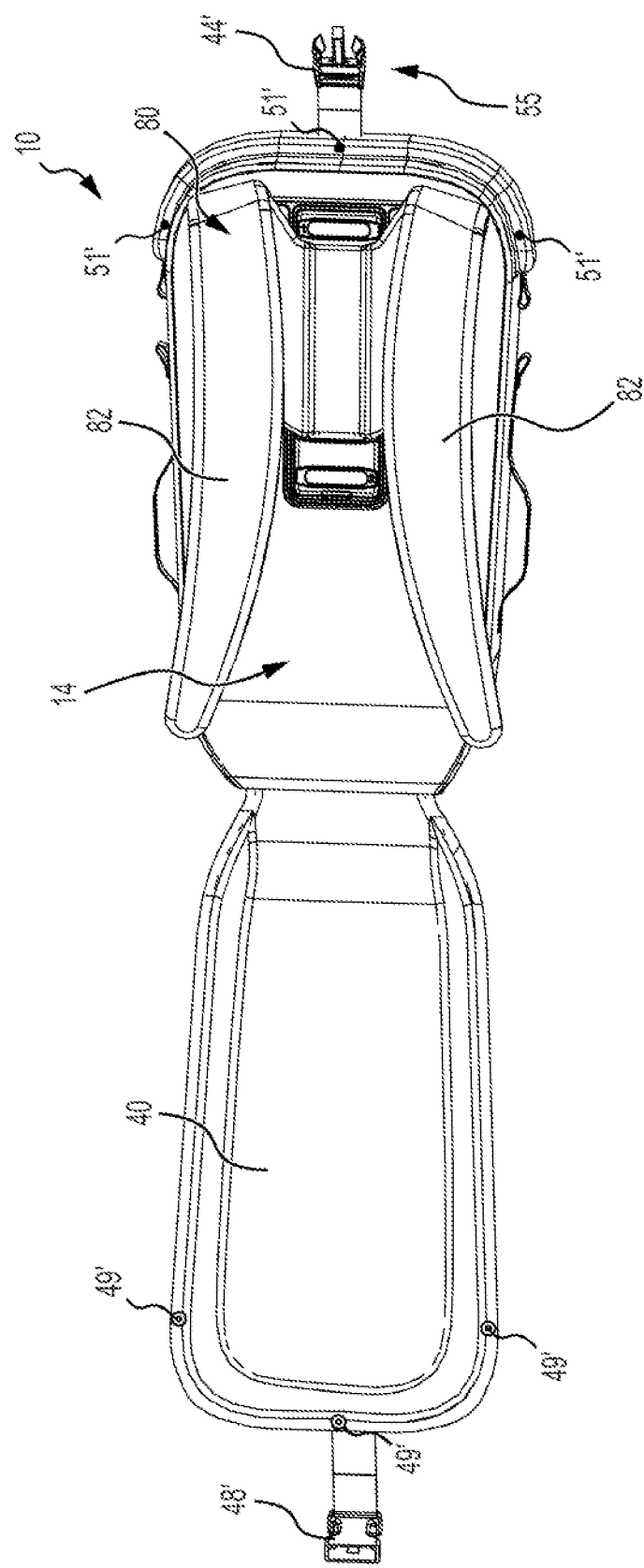
FIG. 23 is a top plan view of the storage container according to an alternative embodiment, shown with the cover thereof unfastened from the container body of the storage container.

Furthermore, it is contemplated that the fastening system 55 could have different fastening features than the zip fastener tracks 44, 46, 48 described above. For instance, in some embodiments, the fastening features could be hook and loop fastening features, buckles and/or snap closures. For example, as shown in FIG. 23, in an alternative embodiment, rather than the zip fastener tracks 44, 46, 48, the fastening system 55 includes a cover buckle 48' and a container body buckle 44' respectively connected to the cover 40 and the container body 12 of the storage container 10. As can be seen, in this example, the container body buckle 44' is disposed on the right side 20 of the storage container 10 and the cover buckle 48' extends from an end of the cover 40 that, when the cover 40 is fastened to the container body 12, is on the right side 20 of the storage container 10. Thus, when the cover 40 is positioned in place either on the upper side 14 or the lower side 16, the buckles 44', 48' are selectively engaged with each other to fasten the cover 40 to cover either the upper side 14 or the lower side 16. It is contemplated that additional buckles may be provided in other implementations. In addition, in this example, the fastening system 55 also includes male snaps 49' disposed on the cover 40 and female snaps 51' disposed on the upper side 14 and the lower side 16 (only the snaps 51' on the upper side 14 being shown in FIG. 23). In particular, three male snaps 49' are disposed on each side of the cover 40, and three female snaps 51' are disposed on each of the upper side 14 and the lower side 16. The male snaps 49' are engaged with the female snaps 51' to fasten the cover 40 such as to cover the upper side 14 or the lower side 16 of the storage container 10. It is contemplated that the snaps 49', 51' or the buckles 44', 48' could be omitted in other examples of implementation.

As will be appreciated, the fastening system 55 for securing the cover 40 in place is easy to use and allows the cover 40 to stay in place to selectively conceal the vehicle attachment system 50 and the user attachment system 80. As such, the storage container 10 is provided with an aesthetically appealing look despite having the attachment systems 50, 80 on opposite sides thereof. The user 200 can therefore carry the storage container 10 as a backpack as shown in FIG. 2 while concealing the vehicle attachment system 50 to provide a more natural backpack look to the storage container 200. Moreover, the provision of the actuatable vehicle attachment system 50 provides a quick and effective way of securing the storage container 10 onto the vehicle 100.

Furthermore, while the attachment system 80 in the present embodiment is configured for attaching the storage container 10 to the user 200, it is contemplated that, in other embodiments, the attachment system 80 could be a different type of attachment system. For instance, in some embodiments, the attachment system 80 could be another vehicle attachment system, different from the vehicle attachment system 50. For example, the attachment system 80 could have attachment features that are different from the anchors 52 to accommodate connection to different types of attachment features on the vehicle. This may allow the storage container 10 to be removably attached to vehicles implementing different types of attachment features.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A storage container, comprising:
    a container body defining an internal volume for storing items therein;
    a first attachment system connected to the container body, the first attachment system comprising at least one first attachment feature for attaching the storage container;
    a second attachment system connected to the container body, the second attachment system comprising at least one second attachment feature for attaching the storage container, the at least one second attachment feature being different from the at least one first attachment feature;
    a cover moveable between a first position and a second position on the container body to selectively cover the first attachment system and the second attachment system respectively, the cover including a peripheral zip fastener track disposed around a periphery of the cover;
    a first cover fastening feature connected to the container body, the first cover fastening feature being a first zip fastener track;
    a first slider for engaging the first zip fastener track with the peripheral zip fastener track, the first slider being slidable along a length of the first zip fastener track and a length of the peripheral zip fastener track for selectively fastening the first zip fastener track to the peripheral zip fastener track;
    a second cover fastening feature connected to the container body, the second cover fastening feature being a second zip fastener track; and
    a second slider for engaging the second zip fastener track with the peripheral zip fastener track, the second slider being slidable along a length of the second zip fastener track and the length of the peripheral zip fastener track for selectively fastening the second zip fastener track to the peripheral zip fastener track,
    in the first position, the periphery of the cover being fastened to the container body via engagement between the first zip fastener track and the peripheral zip fastener track,
    in the second position, the periphery of the cover being fastened to the container body via engagement between the second zip fastener track and the peripheral zip fastener track.

2. The storage container of claim 1, wherein:
    the at least one first attachment feature is configured for attaching the storage container to a user for carrying of the storage container by the user; and
    the at least one second attachment feature is configured for attaching the storage container to a vehicle.

3. The storage container of claim 2, wherein:
    the container body defines an opening for accessing the internal volume; and
    the opening is disposed at an end of the container body such that the opening is configured to face upward when the storage container is attached to the user.

4. The storage container of claim 1, wherein the at least one first attachment feature comprises at least one shoulder strap for attaching the storage container to a user.

5. The storage container of claim 4, wherein the at least one shoulder strap includes two shoulder straps for attaching the storage container on the user's back.

6. The storage container of claim 1, wherein the at least one second attachment feature comprises at least one anchor for removably attaching the storage container to a vehicle.

7. The storage container of claim 6, wherein each of the at least one anchor comprises an anchor lock that is moveable between a locked position and an unlocked position to selectively lock the at least one anchor to an anchor fixture connected to the vehicle.

8. The storage container of claim 1, wherein the at least one first attachment feature is disposed, at least partially, on an opposite side of the container body from the at least one second attachment feature.

9. The storage container of claim 1, wherein the cover comprises a flap, the cover having a fixed end connected to the container body, the fixed end being in a same position in the first position and the second position of the cover.

10. The storage container of claim 1, wherein the internal volume is disposed between the at least one first attachment feature and the at least one second attachment feature.

11. A vehicle, comprising:
    a driver seat;
    a motor for driving the vehicle; and
    the storage container of claim 1, the storage container being selectively attached to the vehicle via the at least one second attachment feature, the cover being in the first position to cover the first attachment system.

12. A system for covering part of a storage container, comprising:
    a first zip fastener track configured to be connected to a container body of the storage container;
    a second zip fastener track configured to be connected to the container body of the storage container;
    a third zip fastener track configured to be connected to a cover of the storage container;
    a first slider for engaging the first zip fastener track with the third zip fastener track, the first slider being slidable along a length of the first zip fastener track and a length of the third zip fastener track for selectively fastening the first zip fastener track to the third zip fastener track; and
    a second slider for engaging the second zip fastener track with the third zip fastener track, the second slider being slidable along a length of the second zip fastener track and the length of the third zip fastener track for selectively fastening the second zip fastener track to the third zip fastener track, in a closed position of the first slider, the first zip fastener track being fastened to the third zip fastener track along the lengths thereof such that the cover is in a first position covering a first attachment system of the storage container, in a closed position of the second slider, the second zip fastener track being fastened to the third zip fastener track along the lengths thereof such that the cover is in a second position covering a second attachment system of the storage container.

13. The system of claim 12, wherein:
in the closed position of the first slider, the second slider is in an open position in which at least a majority of the second zip fastener track is unfastened from the third zip fastener track; and
in the closed position of the second slider, the first slider is in an open position in which at least a majority of the first zip fastener track is unfastened from the third zip fastener track.

14. The system of claim 12, wherein each of the first and second zip fastener tracks describes a generally U-shaped path.

15. The system of claim 12, wherein the first and second zip fastener tracks are configured to be disposed on opposite sides of the container body.

16. A storage container, comprising:
a container body defining an internal volume for storing items therein;
a first attachment system connected to the container body, the first attachment system comprising at least one first attachment feature for attaching the storage container;
a second attachment system connected to the container body, the second attachment system comprising at least one second attachment feature for attaching the storage container, the at least one second attachment feature being different from the at least one first attachment feature;
a cover moveable between a first position and a second position on the container body to selectively cover the first attachment system and the second attachment system respectively; and
the system of claim 12 for selectively securing the cover in the first position and the second position.

17. The storage container of claim 16, wherein:
the third zip fastener track is a peripheral zip fastener track disposed around a periphery of the cover;
in the first position, the periphery of the cover is fastened to the container body via engagement between the first zip fastener track and the peripheral zip fastener track; and
in the second position, the periphery of the cover is fastened to the container body via engagement between the second zip fastener track and the peripheral zip fastener track.

18. A storage container, comprising:
a container body defining an internal volume for storing items therein;
a first attachment system connected to the container body, the first attachment system comprising at least one first attachment feature for attaching the storage container;
a second attachment system connected to the container body, the second attachment system comprising at least one second attachment feature for attaching the storage container, the at least one second attachment feature being different from the at least one first attachment feature;
a cover moveable between a first position and a second position on the container body to selectively cover the first attachment system and the second attachment system respectively;
a first cover fastening feature connected to the container body; and
a second cover fastening feature connected to the container body,
in the first position, the cover being fastened to the first cover fastening feature,
in the second position, the cover being fastened to the second cover fastening feature.

* * * * *